US011588569B2

(12) United States Patent
Yoon

(10) Patent No.: US 11,588,569 B2
(45) Date of Patent: Feb. 21, 2023

(54) METHOD AND APPARATUS FOR TRANSMITTING AND RECEIVING SIDELINK SYNCHRONIZATION SIGNAL IN WIRELESS COMMUNICATION SYSTEM

(71) Applicant: Innovative Technology Lab Co., Ltd., Seoul (KR)

(72) Inventor: Sung Jun Yoon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 0 days.

(21) Appl. No.: 17/167,350

(22) Filed: Feb. 4, 2021

(65) Prior Publication Data

US 2021/0167883 A1    Jun. 3, 2021

Related U.S. Application Data

(63) Continuation of application No. PCT/KR2019/010173, filed on Aug. 9, 2019.

(30) Foreign Application Priority Data

Aug. 10, 2018    (KR) .......................... 10-2018-0093879

(51) Int. Cl.
*H04J 11/00* (2006.01)
*H04L 27/26* (2006.01)
*H04W 92/18* (2009.01)

(52) U.S. Cl.
CPC ....... *H04J 11/0073* (2013.01); *H04J 11/0076* (2013.01); *H04L 27/2607* (2013.01); *H04W 92/18* (2013.01)

(58) Field of Classification Search
CPC .. H04J 11/0073; H04J 11/0076; H04W 92/18; H04L 27/2607
See application file for complete search history.

(56) References Cited

U.S. PATENT DOCUMENTS

2022/0006569 A1*  1/2022  Lee .................. H04W 72/0406
2022/0159623 A1*  5/2022  Seo ........................ H04L 1/1896

FOREIGN PATENT DOCUMENTS

KR    1020170112799 A    10/2017
WO    2018008981 A1    1/2018
(Continued)

OTHER PUBLICATIONS

Extended European Search Report for European Patent Application No. 19 846 704.5, dated Apr. 4, 2022.
(Continued)

*Primary Examiner* — Shukri Taha

(57) ABSTRACT

The present disclosure relates to a method and apparatus for transmitting and receiving a sidelink synchronization signal in a wireless communication system. A method of transmitting, by a first user equipment (UE), a sidelink synchronization signal to a second UE in a wireless communication system according to an example of the present disclosure may include determining values of $N_{ID}^{(1)}$ and $N_{ID}^{(2)}$ corresponding to a sidelink identifier (SLID) value based on a number of types of a physical layer sidelink synchronization identity set and a number of sequences included in each type of the physical layer sidelink synchronization identity set; generating a sidelink primary synchronization signal (PSS) sequence and a sidelink secondary synchronization signal (SSS) sequence based on a first primitive polynomial, a second primitive polynomial, and a cyclic shift (CS) value; and mapping, on physical resources, and thereby transmitting the sidelink PSS sequence and the sidelink SSS sequence.

23 Claims, 13 Drawing Sheets

(56) References Cited

FOREIGN PATENT DOCUMENTS

| WO | 2018031061 | A1 | | 2/2018 | |
|---|---|---|---|---|---|
| WO | 2018128867 | A1 | | 7/2018 | |
| WO | WO-2020167891 | A1 | * | 8/2020 | .......... H04J 11/0069 |

OTHER PUBLICATIONS

International Search Report for International Patent Application No. PCT/KR2019/010173, dated Dec. 9, 2019.
Written Opinion for International Patent Application No. PCT/KR2019/010173, dated Dec. 9, 2019.
"3rd Generation Partnership Project; Technical Specification Group Radio Access Network; NR; Physical channels and modulation (Release 15)", 3GPP TS 38.211 V15.2.0, Jun. 2018, pp. 1-93, 3GPP Organizational Partners.
ITL, "Mathematical analysis based on theorems of M-sequence for NR-SSS", R1-1708320, 3GPP TSG RAN WG1 Meeting #89, Hangzhou, China, May 15-19, 2017, pp. 1-7.
Huawei, HiSilicon, "SLSS and PSBCH design for V2V PC5", R1-164866, 3GPP TSG RAN WG1 Meeting #85, Nanjing, China May 23-27, 2016, pp. 1-6.
Ericsson, "Cell Identification in V2V", R4-166144, 3GPP TSG RAN WG4 Meeting #80, Gothenburg, Sweden, Aug. 22-26, 2016, pp. 1-4.
Examination report under sections 12 & 13 of the Patents Act, 1970 and the Patents Rules, 2003 for Application No. 202117006449 from Intellectual Property INDIA dated May 24, 2022.

* cited by examiner

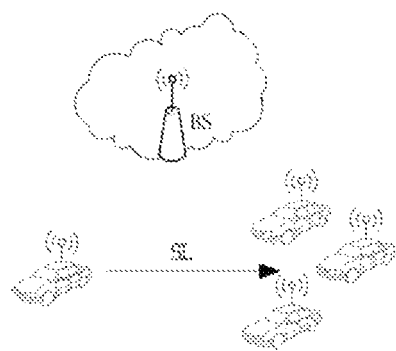
(a) V2V OPERATION
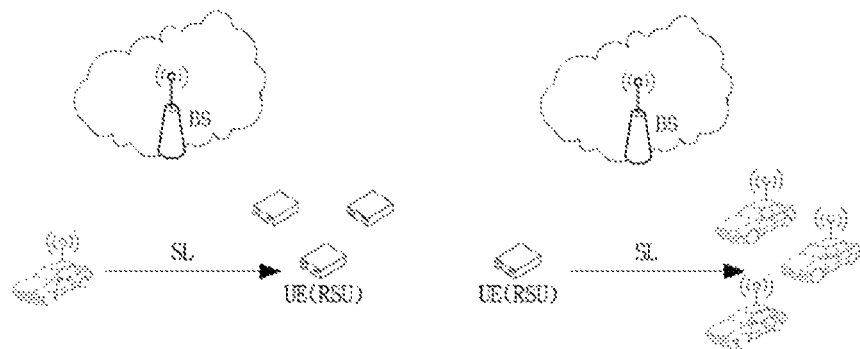
(b) V2I OPERATION
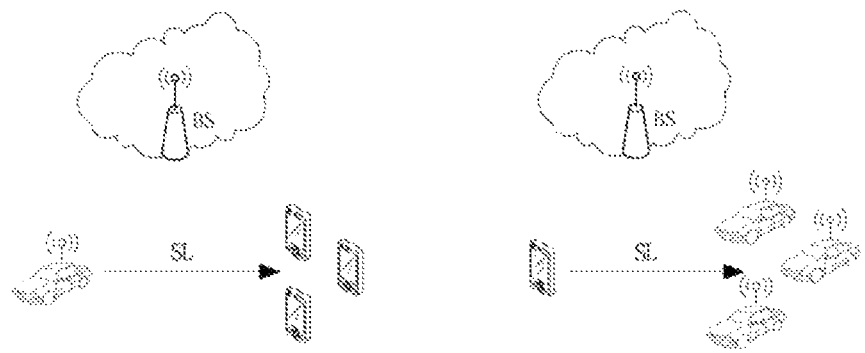
(c) V2P OPERATION

FIG. 2
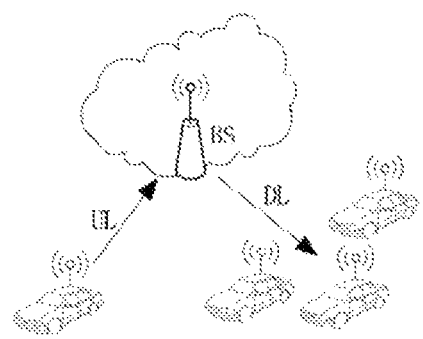
(a) V2V OPERATION
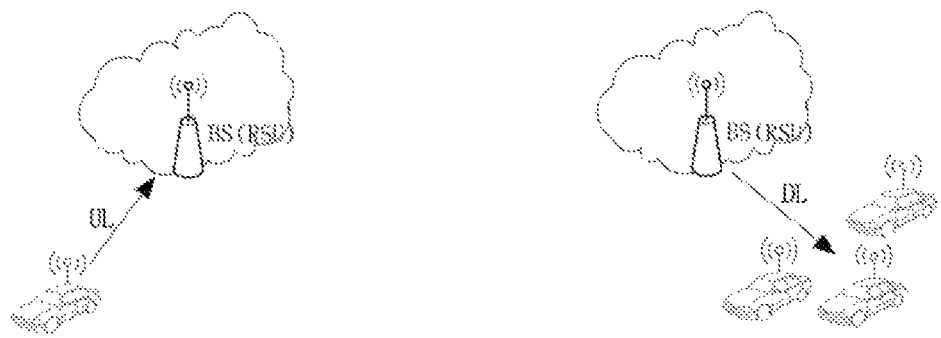
(b) V2I OPERATION
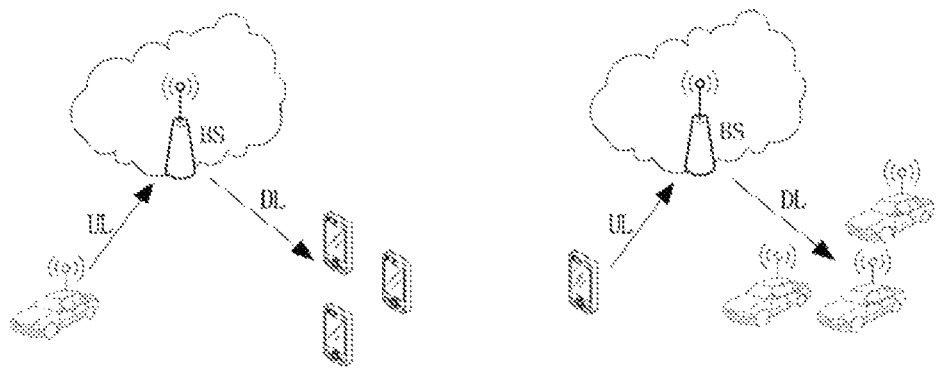
(c) V2P OPERATION (a)

(b)

FIG. 6
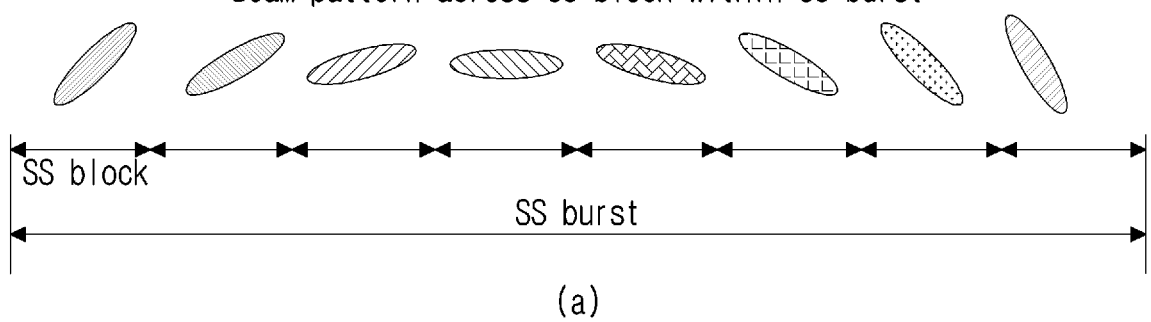
(a)
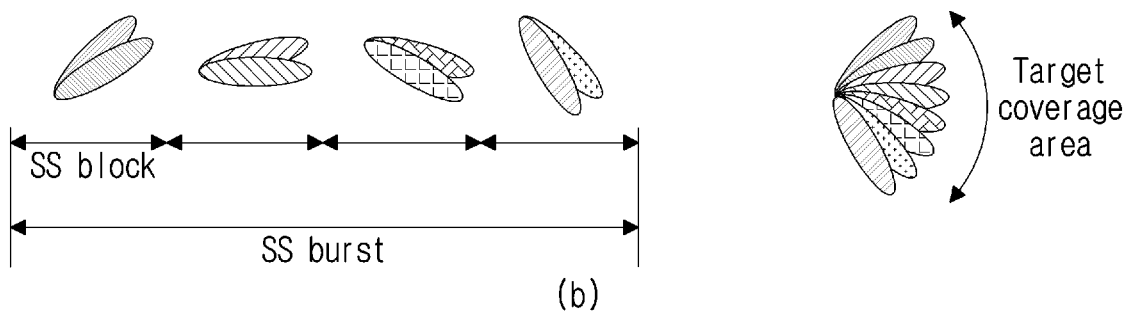
(b)

METHOD AND APPARATUS FOR TRANSMITTING AND RECEIVING SIDELINK SYNCHRONIZATION SIGNAL IN WIRELESS COMMUNICATION SYSTEM

CROSS-REFERENCE TO RELATED APPLICATIONS

This application is a continuation of pending PCT International Patent Application No. PCT/KR2019/010173, filed on Aug. 9, 2019, which claims priority from and the benefit of Korean Patent Application No. 10-2018-0093879, filed on Aug. 10, 2018, each of which is hereby incorporated by reference in its entirety.

BACKGROUND

1. Field

The present disclosure relates to a method and apparatus for transmitting and receiving a sidelink synchronization signal in a wireless communication system, and more particularly, to a method and apparatus for setting and generating a sequence of a sidelink synchronization signal in a new radio (NR) wireless communication system supporting various numerologies and transmitting or receiving a synchronization signal on a sidelink.

2. Discussion of the Background

A 3rd generation partnership project (3GPP) new radio (NR) system may support various numerologies with respect to a time-frequency resource unit standard into consideration of various scenarios, service requirements, potential system compatibility, etc., to meet requirements for 5-th generation (5G) communication. Also, the NR system may support transmission of a physical signal or a physical channel through a plurality of beams to outperform poor channel environments, such as high pathloss, phase noise, and frequency offset, occurring on a high carrier frequency. Through this, the NR system may support applications, such as, for example, enhanced Mobile Broadband (eMBB), massive Machine Type Communications (mMTC), ultra Machine Type Communications (uMTC), Ultra Reliable and Low Latency Communications (URLLC), and the like.

Vehicle-to-X; Vehicle-to-everything (V2X) communication refers to a communication method of exchanging or sharing information, such as traffic conditions, through communication with other vehicles and/or road infrastructures during driving. V2X may include, for example, vehicle-to-vehicle (V2V) that refers to communication between vehicles, vehicle-to-pedestrian (V2P) that refers to communication between a vehicle and a user equipment (UE) carried by a pedestrian user, and vehicle-to-infrastructure/network (V2I/N) that refers to communication between a vehicle and a roadside unit (RSU)/network. Also, the V2X communication may include a method of using a PC5 link (or a sidelink) that is a device-to-device (D2D) communication interface, a method of using an Uu link (or an uplink and a downlink) that is a communication interface between a base station and a UE, or a method of using all of the PC5 link and the Uu link.

5G sidelink technology is under discussion for incorporation of new and diverse services, such as automatic driving or remote driving, through performance improvement of ultra high reliability and/or ultra low latency, in 5G mobile communication. Basically, a communication protocol on a 5G sidelink requires acquiring a synchronization on a sidelink. Definition of a synchronization reference on the 5G sidelink and setting and generation of a synchronization signal sequence according to the synchronization reference are not determined in detail so far.

SUMMARY

An aspect of the present disclosure provides a method and apparatus for defining a sidelink synchronization reference, and setting and generating a synchronization signal sequence according to the sidelink synchronization reference.

Another aspect of the present disclosure provides a method and apparatus for generating and transmitting and receiving an M-sequence based synchronization signal sequence with respect to each of a sidelink primary synchronization signal (PSS) and a sidelink secondary synchronization signal (SSS).

Another aspect of the present disclosure provides a method and apparatus for setting and generating a sidelink synchronization signal for improving a performance of distinguishing a downlink synchronization signal.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, there is provided a method of transmitting, by a first user equipment (UE), a sidelink synchronization signal to a second UE in a wireless communication system, the method including: determining values of $N_{ID}^{(1)}$ and $N_{ID}^{(2)}$ corresponding to a sidelink identifier (SLID) value based on a number of types of a physical layer sidelink synchronization identity set and a number of sequences included in each type of the physical layer sidelink synchronization identity set; generating a sidelink primary synchronization signal (PSS) sequence by applying a first initialization value to a first primitive polynomial and applying a cyclic shift (CS) to the sidelink PSS sequence based on the value of $N_{ID}^{(2)}$; generating a sidelink secondary synchronization signal (SSS) sequence by applying a second initialization value to each of the first primitive polynomial and a second primitive polynomial, and applying CS to the sidelink SSS sequence based on the values of $N_{ID}^{(1)}$ and $N_{ID}^{(2)}$; and mapping, on physical resources, and thereby transmitting the sidelink PSS sequence to which the CS is applied and the sidelink SSS sequence to which the CS is applied. At least one of the first primitive polynomial, the second primitive polynomial, a CS value for the sidelink PSS sequence, and a CS value for the sidelink SSS sequence is applied to be distinguished from at least one of a first primitive polynomial and a second primitive polynomial applied to a downlink PSS or a downlink SSS, a CS value for a downlink PSS sequence, and a CS value for a downlink SSS sequence.

The features briefly summarized above with respect to the present disclosure are provided as an example only to explain the detailed description and are not construed to limit the scope of the present disclosure.

According to the present disclosure, there may be provided a method and apparatus for setting and generating a synchronization signal sequence according to a sidelink synchronization reference.

Also, according to the present disclosure, there may be provided a method and apparatus for generating and transmitting and receiving an M-sequence based synchronization signal sequence with respect to each of a sidelink primary synchronization signal (PSS) and a sidelink secondary synchronization signal (SSS).

Also, according to the present disclosure, there may be provided a method and apparatus for setting and generating a sidelink synchronization signal for improving a performance of distinguishing a downlink synchronization signal.

Also, according to the present disclosure, it is possible to reduce a complexity of generating a sidelink synchronization signal and to maximize a performance of distinguishing a downlink synchronization signal using a primitive polynomial or a cyclic shift value with respect to the sidelink synchronization signal.

Effects which can be acquired by the disclosure are not limited to the above described effects, and other effects that have not been mentioned may be clearly understood by those skilled in the art from the following description.

BRIEF DESCRIPTION OF DRAWINGS

FIG. 1, FIG. 2, and FIG. 3 illustrate examples of describing a vehicle-to-everything (V2X) scenario according to the present disclosure;

FIG. 6 illustrates an example of a transmission through a plurality of beams in a synchronization signal transmission according to the present disclosure.

DETAILED DESCRIPTION OF THE ILLUSTRATED EMBODIMENTS

Figure 3:
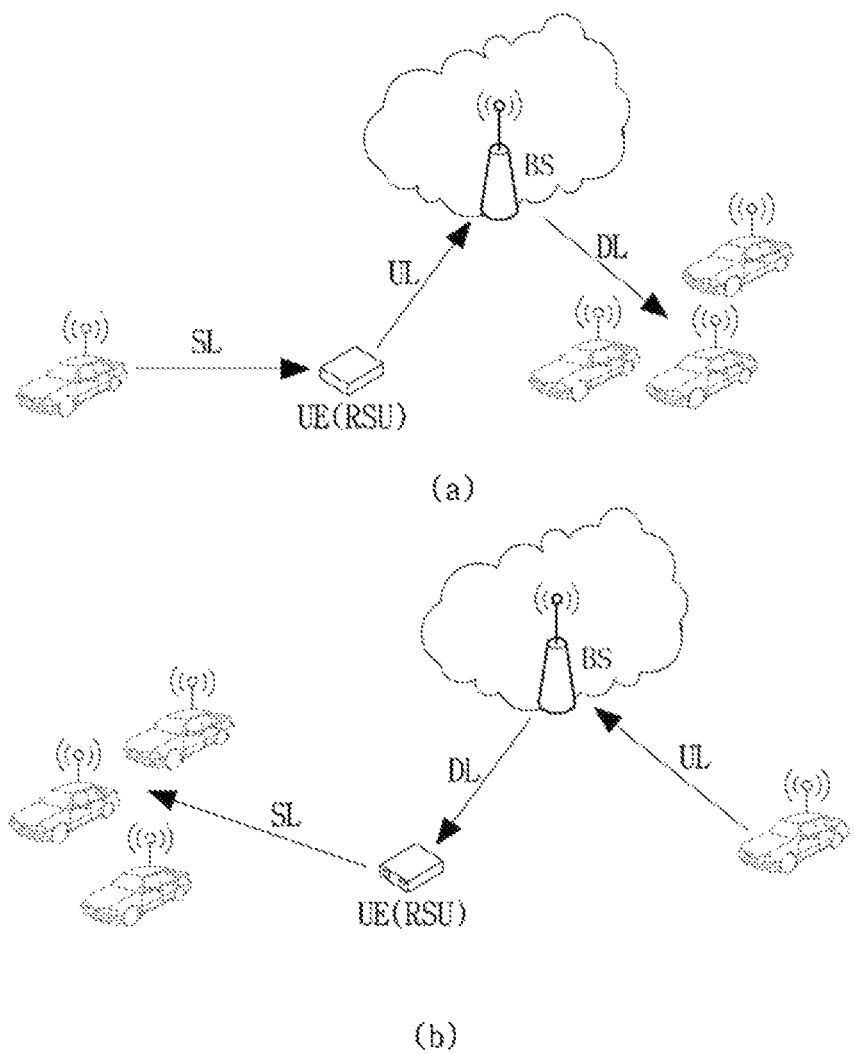

Hereinafter, examples of the present disclosure will be described in detail so that those skilled in the art can easily carry out the examples referring to the accompanying drawings. However, the present disclosure may be embodied in many different forms and is not limited to the examples described herein.

In the following description of the examples of the present disclosure, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "connected" to another element, it is understood to include not only a direct connection relationship but also an indirect connection relationship. Also, when an element is referred to as "containing" or "having" another element, it means not only excluding another element but also further including another element.

In the present disclosure, the terms first, second, and so on are used only for the purpose of distinguishing one element from another, and do not limit the order or importance of the elements unless specifically mentioned. Thus, within the scope of this disclosure, the first component in an example may be referred to as a second component in another example, and similarly a second component in an example may be referred to as a second component in another example.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed examples are also included within the scope of the present disclosure, unless otherwise noted.

In the present disclosure, the components described in the various examples do not necessarily mean essential components, but some may be optional components. Accordingly, examples consisting of a subset of the components described in an example are also included within the scope of this disclosure. Also, examples that include other components in addition to the components described in the various examples are also included in the scope of the present disclosure. Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following, for clarity of description, term of description related thereto is made below.

D2D: Device to Device (communication)
GNSS: Global Navigation Satellite System
RSU: Road Side Unit
SL: Sidelink
SLSS: Sidelink Synchronization Signal
SCI: Sidelink Control Information PSSCH: Physical Sidelink Shared Channel
PSBCH: Physical Sidelink Broadcast Channel
PSCCH: Physical Sidelink Control Channel
PSDCH: Physical Sidelink Discovery Channel
ProSe: (Device to Device) Proximity Services
PSSID(SLID): Physical-layer Sidelink Synchronization Identity (Sidelink Identity)
$n_{ID}^{SA}$: Sidelink Group Destination Identity
$N_{ID}^{SL}$: Physical Layer Sidelink Synchronization Identity
SA: Scheduling assignment
TB: Transport Block
TTI: Transmission Time Interval
RB: Resource Block
V2V: Vehicle to Vehicle
V2P: Vehicle to Pedestrian
V2I/N: Vehicle to Infrastructure/Network Herein, a 5G system may be defined to include any of existing Long Term Evolution (LTE) based systems as well as a new radio (NR) system. That is, the 5G system may include a case in which LTE based wireless access technology and NR wireless access technology are applied together as well as a case in which the NR wireless access technology alone is applied. Also, 5G sidelink technology may include all of sidelink technology to which NR alone is applied and sidelink technology to which LTE and NR are applied together.

In V2X communication, control information transmitted from a UE to another UE may be scheduling assignment (SA). If the aforementioned control information is used for sidelink communication, the control information may be SCI. Here, if the control information is transmitted through a sidelink, the control information may be transmitted through the aforementioned PSCCH that is a channel used to transmit control information in the sidelink.

Also, data transmitted from a UE to another UE may be configured based on a unit of a transport port (TB). Here, if the data is transmitted through a sidelink, the data may be transmitted through the aforementioned PSSCH that is a channel used to transmit data.

Herein, an operation mode may be defined based on a resource allocation method for transmitting data and control information for V2X communication or direct link (e.g., D2D, ProSe, or SL) communication.

An base station (BS) resource scheduling mode (eNodeB resource scheduling mode) may be a mode in which a BS (eNodeB) or a relay node schedules resources used for a UE to transmit V2X (or direct link) control information and/or data. Through this, the UE may transmit the V2X (or direct link) control information and/or data. This mode may refer to the BS resource scheduling mode.

For example, the BS or the relay node may provide, to a sidelink (or direct link) transmitting UE, scheduling information about resources used to transmit sidelink (or direct ink) control information and/or data through downlink control information (DCI). Therefore, the sidelink (or direct link) transmitting UE may transmit the sidelink (or direct link) control information and data to a sidelink (or direct link) receiving UE, and the sidelink (or direct link) receiving UE may receive sidelink (or direct link) data based on the sidelink (or direct link) control information.

Meanwhile, a UE autonomous resource selection mode may be a mode in which a UE autonomously selects resources used to transmit control information and data and such resource selection may be determined through sensing of the UE from a resource pool (i.e., a set of resource candidates). Through this, the UE may transmit control information and data. This mode may refer to the UE autonomous resource selection mode.

For example, the sidelink (or direct link) transmitting UE may transmit sidelink (or direct link) control information and data to the sidelink (or direct link) receiving UE using its selected resource, and the sidelink (or direct link) receiving UE may receive sidelink (or direct link) data based on sidelink (or direct link) control information.

Here, for example, the aforementioned BS resource scheduling mode may be referred to as Mode 1 in sidelink (or direct link) communication for D2D and the like. Also, the BS resource scheduling mode may be referred to as Mode 3 in sidelink communication for V2X and the like. Also, the UE autonomous resource selection mode may be referred to as Mode 2 in sidelink (or direct link) communication for D2D and the like. Also, the UE autonomous resource selection mode may be referred to as Mode 4 in sidelink communication for V2X and the like.

Also, although the following description is made based on V2X communication for clarity of description, it is provided as an example only. For example, the present disclosure may apply alike to communication based on a direct link such as D2D, ProSe, and the like, and the present disclosure is not limited thereto.

Also, for example, V2X may be a general term for V2V, V2P, and V2I/N. Here, each of V2V, V2P, and V2I/N may be defined as the following Table 1 connected with LTE (Long Term Evolution).

TABLE 1

| | |
|---|---|
| V2V | LTE or NR based communication between a vehicle and another vehicle |
| V2P | LTE or NR based communication between a vehicle and a device carried by an individual (e.g., a terminal carried by a pedestrian, a cyclist, a driver, or a passenger) |
| V2I/N | LTE or NR based communication between a vehicle and a roadside unit(RSU)/network The RSU refers to a suspended social infrastructure entity that supports V2X applications and may exchange messages with other independent entities that support V2X applications. The RSU is a logical independent entity integrated with a V2X application logic having functions of a BS (in this case, referable as a eNB-type RSU) or a UE (in this case, referable as a UE-type RSU). |

Also, V2X communication may include PC-5 based communication that is an interface for sidelink communication, for this, as the D2D communication link (e.g., direct interface between a Device and a Device supporting the ProSe system). For V2X operation, various scenarios such as the following Table 2, Table 3, and Table 4, referring FIG. 1, FIG. 2, and FIG. 3, are considered.

For example, the following Table 2 and FIG. 1 may refer to a scenario for supporting a V2X operation based on only a PC5 interface (or SL). Here, (a) of FIG. 1 illustrates an example of a V2V operation, (b) of FIG. 1 illustrates an example of a V2I operation, and (c) of FIG. 1 illustrates an example of a V2P operation.

TABLE 2

Scenario that supports a V2X operation operating based on only PC5

In this scenario, a UE transmits a V2X message to a plurality
of UEs present in a local area through a sidelink.
With respect to V2I, a transmitter UE or receiver UE(s)
may be a UE-type roadside unit (RSU).
With respect to V2P, a transmitter UE or receiver UE(s)
may be a pedestrian UE.

Meanwhile, the following Table 3 and FIG. 2 may refer to a scenario for supporting a V2X operation based on only a Uu interface (i.e., an interface between a UE and a BS). Here, (a) of FIG. 2 illustrates an example of a V2V operation, (b) of FIG. 2 illustrates an example of a V2I operation, and (c) of FIG. 2 illustrates an example of a V2P operation.

TABLE 3

Scenario that supports a V2X operation operating based
on only Uu interface

In this scenario,
With respect to V2V and V2P, a UE transmits a V2X
message to BS through an uplink, and the BS transmits
the V2X message to a plurality of UEs present in a local
area through a downlink.
With respect to V2I, if a receiver is a BS-type roadside
unit (RSU), a UE transmits a V2I message to an
BS-type RSU through an uplink; and if a transmitter is a
BS-type RSU, the BS-type RSU) transmits the V2I
message to a plurality of UEs present in a local area.
With respect to V2P, a transmitter UE or receiver UE(s)
may be a pedestrian UE.
To support this scenario, the BS performs uplink
reception and downlink transmission of a V2X
message and uses a broadcast mechanism with
respect to a downlink.

The following Table 4 and FIG. 3 may refer to a scenario for supporting a V2X operation that uses all of a UE interface and PC5 interface (or SL). Here, (a) of FIG. 3 illustrates Scenario 3A of Table 4 and (b) of FIG. 3 illustrates Scenario 3B of Table 4.

TABLE 4

Scenario in which a UE transmits a V2X message to other
UEs through a sidelink

| | |
|---|---|
| Scenario 3A | In this scenario, a UE transmits a V2X message to other UEs through a sidelink. One of a plurality of receiver UEs is a UE-type RSU and receives the V2X message through the sidelink and transmits the V2X message to an BS through an uplink. The BS receives the V2X message from the UE-type RSU and transmits the V2X message to a plurality of UEs present in a local area through a downlink. To support this scenario, the BS performs uplink reception and downlink transmission of the V2X message, and uses a broadcast mechanism with respect to the downlink. |
| Scenario 3B | In this scenario, a UE transmits a V2X message to an BS through an uplink. The BS transmits the V2X message to at least one UE-type RSU. The UE-type RSU transmits the V2X message to other UEs through a sidelink. To support this scenario, the BS performs uplink reception and downlink transmission of the V2X message, and uses a broadcast mechanism with respect to the downlink. |

As described above, the V2X communication may be performed through the BS and may be performed through direct communication between UEs. Here, if the BS is used, transmission and reception may be performed through a Uu link that is a communication interface between an LTE BS and UE in LTE-based V2X communication. Also, if the sidelink is used for the direct communication between UEs, transmission and reception may be performed through a PC5 link that is a communication interface between LTE UEs in the LTE-based V2X communication.

In LTE, communication from a BS to a UE is referred to as a downlink (DL) and communication from the UE to the BS is referred to as an uplink (UL). Communication from a UE to another UE is further defined as a sidelink (SL) in addition to the uplink (UL) and the downlink (DL).

In the LTE, a technical item of initially using and applying PC5 based sidelink communication is D2D that is a proximity communication (ProSe) for public safety and commercial purposes. Also, in the LTE, a next technical item of applying the PC5 based sidelink communication is V2X that is a communication for vehicles.

Figure 4:
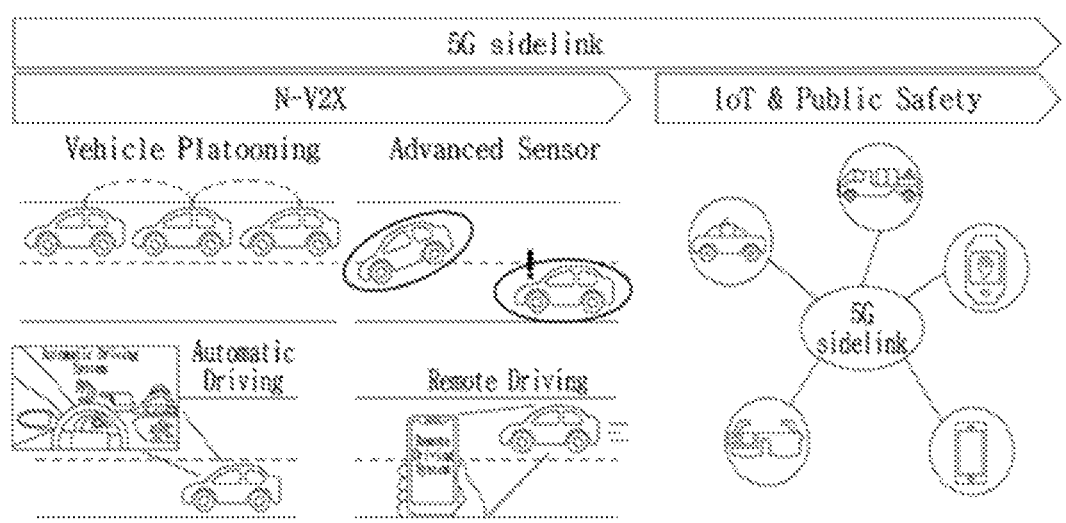
FIG. 4 illustrates an example of a service provided based on a sidelink.

FIG. 4 illustrates an example of a service provided based on a sidelink.

Referring to FIG. 4, a V2X related service or an Internet of Things (IoT) service may be provided based on a 5G sidelink. Here, for example, the 5G sidelink may be a concept that includes all of a sidelink based on an existing LTE system and a sidelink based on an NR system. That is, the 5G sidelink may be a service that is provided by considering the sidelink applied in each system. However, it is provided as an example only.

For example, referring to FIG. 4, with respect to a V2X service, a vehicle platooning, an automatic driving, an advanced sensor, and a remote driving service may be provided. Here, the vehicle platooning may refer to technology that allows a plurality of vehicles to dynamically form a group and operate in a similar manner. Also, the automatic driving may refer to technology that drives a vehicle based on a complete automation and a semi-automation. Also, the advanced sensor may refer to technology that collects and exchanges data acquired from a sensor or a video image. Also, the remote driving may refer to technology for remotely controlling a vehicle and technology for an application. That is, the aforementioned services may be provided as a V2X-based service. Here, the services are provided as examples only and the present disclosure is not limited thereto. Here, requirements, such as ultra latency, ultra connectivity, low power, and high reliability, may be required to provide the V2X service. Therefore, the 5G sidelink may require an operation method for meeting the services and the requirements according thereto. A detailed method considering the requirements is described in the following.

Figure 5:
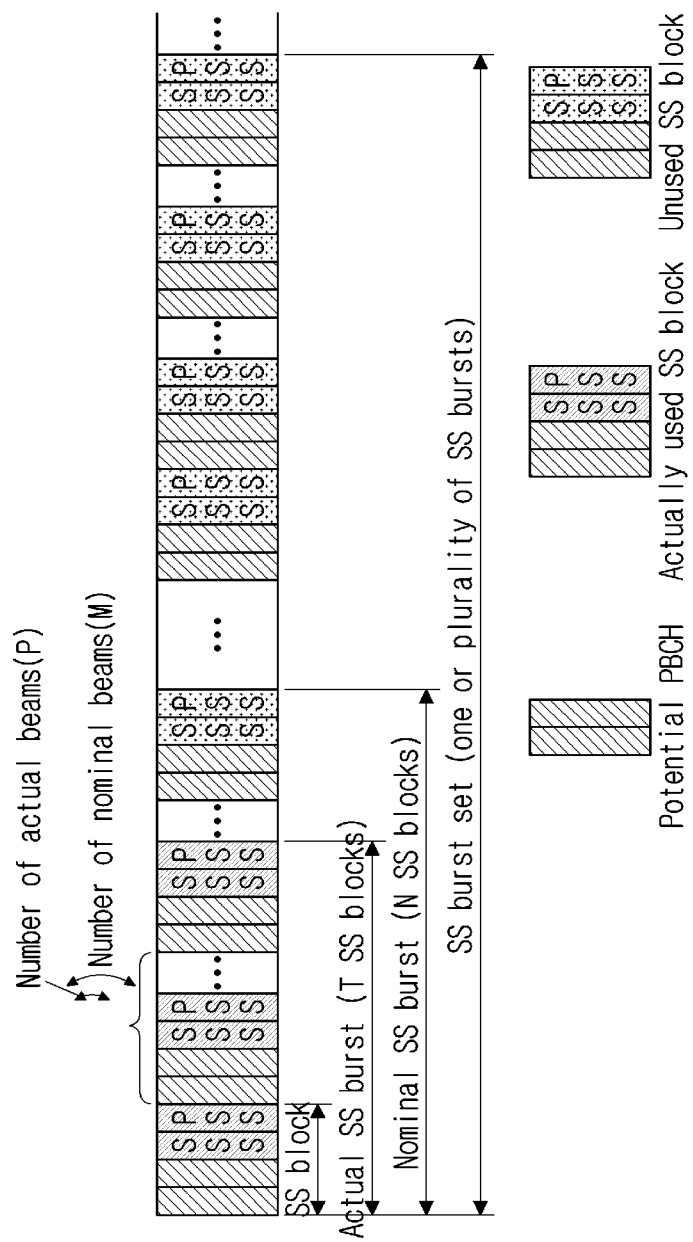
FIG. 5 illustrates an example of a downlink synchronization signal in a wireless communication system.

FIG. 5 illustrates an example of a downlink synchronization signal in a wireless communication system.

In an NR system, two types of synchronization signals may be defined. For example, the two types of synchronization signals may include an NR-primary synchronization signal (NR-PSS) and an NR-secondary synchronization signal (NR-SSS).

The NR-PSS may be used to perform synchronization on an initial symbol boundary in an NR cell.

The NR-SSS may be used to detect an NR cell identifier (ID).

In a previous wireless communication system (e.g., LTE/LTE-A system) of the NR system, a bandwidth for transmission of a PSS/SSS and/or Physical Broadcast Channel (PBCH) is defined as 1.08 megahertz (MHz) corresponding to six physical resource blocks (PRBs). The NR system may use a relatively wide transmission bandwidth to transmit an NR-PSS/SSS and/or NR-PBCH compared to the previous wireless communication system. To this end, the NR system may use a subcarrier spacing (SCS) greater than 15 kilohertz (kHz).

If operating in 6 gigahertz (GHz) or less, one of 15 kHz and 30 kHz may be considered as a default SCS. If operating in 6 GHz or more (e.g., if operating between 6 GHz and 52.5 GHz), one of 120 kHz and 240 kHz may be considered as a default SCS.

In detail, a default SCS set and a minimum carrier bandwidth assumed by a UE during an initial access may be defined as follows. If operating in 6 GHz or less, the UE may basically assume a 15 kHz SCS and a bandwidth of 5 MHz. Also, the UE may assume a 30 kHz SCS and a bandwidth of 10 MHz in a specific band. Also, if operating in 6 GHz or more, the UE may assume a 120 kHz SCS and a bandwidth of 10 MHz.

Also, an SCS supported for data and/or control information based on a specific frequency band may be defined as follows. If operating in 1 GHz or less, SCSs of 15 kHz, 30 kHz, and 60 kHz may be supported. If operating between 1 GHz and 6 GHz, SCSs of 15 kHz, 30 kHz, and 60 kHz may be supported. If operating between 24 GHz and 52.6 GHz, SCSs of 60 kHz and 120 kHz may be supported and 240 kHz may not be supported for data. An SCS to be supported may be defined based on a band.

The NR-PSS, the NR-SSS, and/or the NR-PBCH may be transmitted in a synchronization signal (SS) block. Here, the SS block refers to a time-frequency resource area including all of the NR-PSS, the NR-SSS, and/or the NR-PBCH.

At least one SS block may constitute an SS burst. A single SS burst may be defined to include a predetermined number of SS blocks, which may also be referred to as a duration of the SS burst. Also, at least one SS block may be continuous or discontinuous within a single SS burst. Also, at least one SS block within a single SS burst may be identical or different.

At least one SS burst may constitute an SS burst set. A single SS burst set may be defined to include a predetermined periodicity and a predetermined number of SS bursts. A number of SS bursts within the SS burst set may be defined to be finite. Also, a transmission point in time of the SS burst set may be periodically defined and may also be aperiodically defined.

At least one SCS may be predefined for each synchronization signal (e.g., NR-PSS, NR-SSS, NR-PBCH) with respect to a specific frequency range or carrier. For example, at least one of 15, 30, 120, and 240 kHz may be applied as an SCS.

Here, an SCS for the NR-PSS, the NR-SSS, or the NR-PBCH may be identical. Also, at least one frequency range may be given, and different frequency ranges may overlap. Also, a single numerology may be defined and a plurality of numerologies may be defined with respect to a specific frequency range. Accordingly, one or more SCSs may be defined with respect to the specific frequency range.

Also, from a point of view of a UE, the SS burst set may be periodically transmitted.

FIG. 6 illustrates an example of a transmission through a plurality of beams in a synchronization signal transmission according to the present disclosure.

To overcome a poor channel environment, such as high pathloss, phase-noise, and frequency offset, occurring in a high carrier frequency, an NR system may consider a transmission of a synchronization signal, a random access signal, and a broadcast channel through a plurality of beams.

With respect to the transmission through the plurality of beams, a number of beams used for the transmission and a width of each beam may be variously determined based on a cell environment. Accordingly, a standardization regarding a maximum number of beams and a maximum amount of physical resources required for the transmission is required to provide a degree of freedom for implementation as above.

Hereinafter, a method of transmitting a beam in an SS burst including a single SS block or a plurality of SS blocks is described with reference to FIG. 6.

Referring to (a) of FIG. 6, a single beam is applied for each single SS block and, in general, an analog beamforming method is applied. In this case, a number of applicable beams is limited based on a number of radio frequency (RF) chains.

Referring to (b) of FIG. 6, two beams are applied for each single SS block and, in general, a digital beamforming method or a hybrid beamforming method is applied. Using this method, beam sweeping for covering a target coverage area may be performed further quickly. Therefore, a relatively small number of SS blocks may be used compared to that in (a) of FIG. 6, which may lead to enhancing a network resource consumption efficiency.

Figure 7:
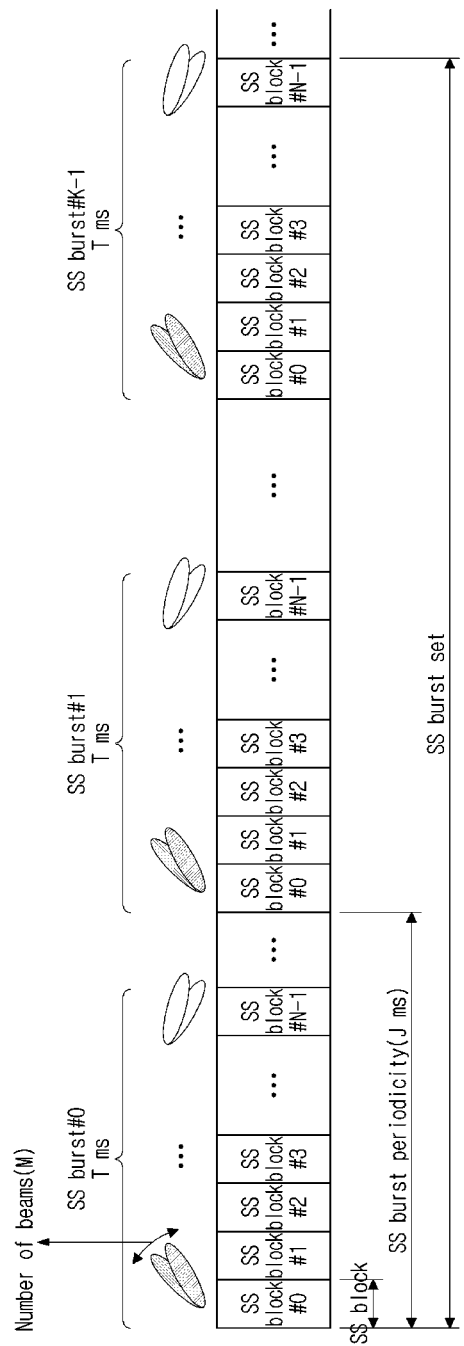
FIG. 7 illustrates an example of a structure of a synchronization signal frame in the case of considering a transmission through a plurality of beams in a synchronization signal transmission according to the present disclosure.

FIG. 7 illustrates an example of a structure of a synchronization signal frame in the case of considering a transmission through a plurality of beams in a synchronization signal transmission according to the present disclosure.

Referring to FIG. 7, in an NR system, a transmission of at least one beam may apply to the same SS block. When a plurality of beams is transmitted to a single SS block, an SS block transmission to which different beam patterns are applied through beam sweeping may be performed to satisfy a target coverage area. Here, the target coverage area indicates that transmission of at least one beam and transmission of each beam are performed to cover the target coverage area based on a beam width/azimuth intended by a base station.

Referring to FIG. 7, a synchronization signal may be transmitted by applying a single beam or a plurality of beams for each single SS block. Within a single SS block, at least one of an NR-PSS, an NR-SSS, and an NR-PBCH may be transmitted. With respect to a given frequency band, a single SS block corresponds to N OFDM symbols defined based on a default SCS. Here, N denotes a constant. For example, if N=4, four OFDM symbols may be used within a single SS block. Here, a single OFDM symbol may be used for the NR-PSS, another single OFDM symbol may be used for the NR-SSS, and the remaining two OFDM symbols may be used for the NR-PBCH.

Referring to FIG. 7, a single SS block or a plurality of SS blocks may be configured as a single SS burst. SS blocks that constitute a single SS burst may be consecutively allocated or inconsecutively allocated in a time domain or a frequency domain.

Referring to FIG. 7, a single SS burst or a plurality of SS bursts may be configured as a single SS burst set. From a point of view of a UE, the SS burst set is periodically transmitted and the UE assumes a default transmission period value during an initial cell selection per specific carrier frequency. The UE may receive updated information on the SS burst set transmission period from the base station.

The UE may induce a symbol/slot index and a radio frame index from a single SS block time index. A symbol/slot index and a radio frame index according to an SS block time index of each SS block may be prefixed and thereby defined. Accordingly, if the SS block time index of each SS block is known, a frame/symbol timing of each SS block may be known based on a relationship between the SS block time index and the symbol/slot index and the radio frame index that are prefixed and thereby defined. Through this, the entire frame/symbol timings may be known.

Here, in the case of the SS block time index, 1) an SS burst index may be defined within the SS burst set and a time index for a single SS block may be defined for each SS block within a single SS burst, and 2) a time index for a single SS block may be defined for each SS block within an SS burst set.

Also, transmission of SS blocks within the SS burst set may be confined within a 5-ms window regardless of SS burst set periodicity. A number of available candidate SS block locations within the 5-ms window may be given as L. In detail, L denotes a maximum number of SS blocks within the SS burst set and may be defined based on a frequency range as follows. For example, L=4 in the frequency range of 3 GHz or less, L=8 in the frequency range of 3 GHz to 6 GHz, and L=64 in the frequency range of 6 GHz to 52.6 GHz.

Also, in the case of an initial access such as a cell selection, a default value for the SS burst set periodicity may be defined as 20 ms.

Figure 8:
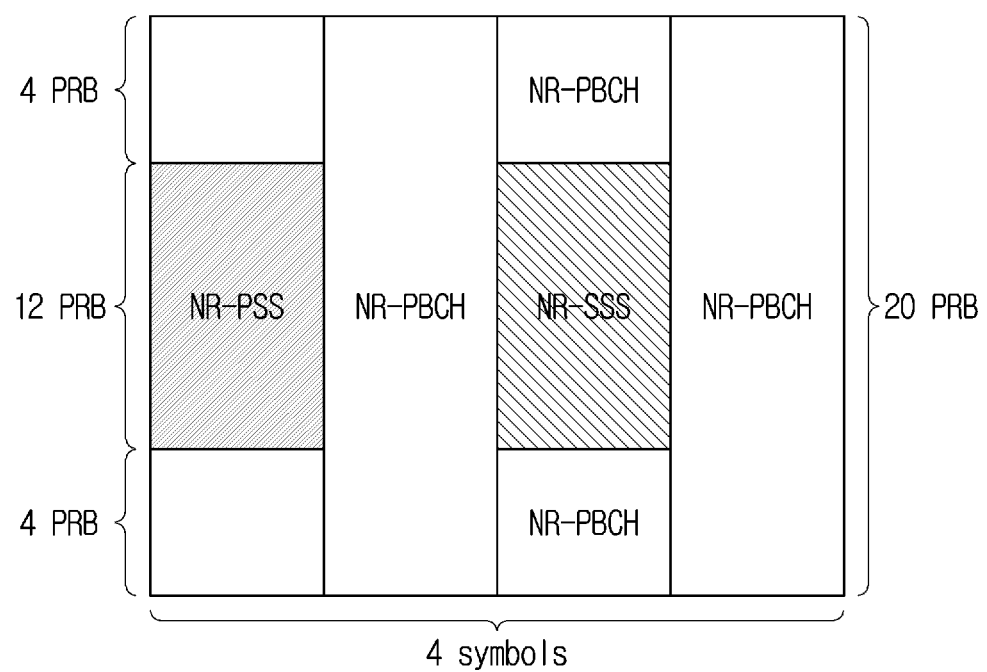
FIG. 8 illustrates an example of a structure of a synchronization signal (SS) block according to the present disclosure.

FIG. 8 illustrates an example of a structure of a synchronization signal (SS) block according to the present disclosure.

Referring to FIG. 8, an NR-PSS, an NR-SSS, and/or an NR-PBCH may be present in a single SS block. A single SS block may correspond to 4 OFDM symbols in a time domain and may correspond to 20 PRBs in a frequency domain. The NR-PSS may be mapped to 12 PRBs of a first symbol, the NR-SSS may be mapped to 12 PRBs of a third symbol, and the NR-PBCH may be mapped to 20 PRBs of each of a second symbol and a fourth symbol within the SS block. Also, the NR-PBCH may be additionally mapped to 4 PRBs at each of both ends of the third symbol of the SS block. Also, a demodulation-reference signal (DM-RS) associated with the NR-PBCH may also be mapped within the SS block.

Also, SCSs supported for the SS block may be 15 kHz and 30 kHz if operating in 6 GHz or less, and may be 120 kHz and 240 kHz if operating in 6 GHz or more.

Hereinafter, a downlink synchronization signal sequence in an NR system is described.

A total of 3 NR-PSS sequences may be present. If an NR-PSS is configured based on a pure binary phase shift keying (BPSK) M-sequence in a frequency domain, $x^7+x^4+1$ may be used as a primitive polynomial. A total of 3 NR-PSS sequences may be acquired by cyclically shifting the primitive polynomial by 0, 43, and 86 on the frequency domain. Here, a shift register value used to generate a sequence through the primitive polynomial may be represented as 11101110 using a binary system. Here, the NR-PSS may have a sequence length of 127 and may be continuously mapped to a total of 127 subcarriers.

Also, an NR-SSS may be configured based on a pure BPSK M-sequence. Here, the NR-SSS may have a sequence length of 127 identical to that of the NR-PSS, and may be continuously mapped to a total of 127 subcarriers. Here, since about 1000 physical cell IDs (PCIDs) are considered for NR, about 1000 NR-SSS sequences may be required.

M-sequence may be generated based on an irreducible primitive polynomial over GF(2). With respect to the length of 127(=$2^7$−1), the M-sequence may be generated based on one of a total of 18 irreducible primitive polynomials as shown in the following Table 5.

TABLE 5

| Decimal | Octal | Binary | Polynomial |
| --- | --- | --- | --- |
| 131 | 203 | 10000011 | $x^7 + x + 1$ |
| 137 | 211 | 10001001 | $x^7 + x^3 + 1$ |
| 143 | 217 | 10001111 | $x^7 + x^3 + x^2 + x + 1$ |
| 145 | 221 | 10010001 | $x^7 + x^4 + 1$ |
| 157 | 235 | 10011101 | $x^7 + x^4 + x^3 + x^2 + 1$ |
| 167 | 247 | 10100111 | $x^7 + x^5 + x^2 + x + 1$ |
| 171 | 253 | 10101011 | $x^7 + x^5 + x^3 + x + 1$ |
| 185 | 271 | 10111001 | $x^7 + x^5 + x^4 + x^3 + 1$ |
| 191 | 277 | 10111111 | $x^7 + x^5 + x^4 + x^3 + x^2 + x + 1$ |
| 193 | 301 | 11000001 | $x^7 + x^6 + 1$ |
| 203 | 313 | 11001011 | $x^7 + x^6 + x^3 + x + 1$ |
| 211 | 323 | 11010011 | $x^7 + x^6 + x^4 + x + 1$ |
| 213 | 325 | 11010101 | $x^7 + x^6 + x^4 + x^2 + 1$ |
| 229 | 345 | 11100101 | $x^7 + x^6 + x^5 + x^2 + 1$ |
| 239 | 357 | 11101111 | $x^7 + x^6 + x^5 + x^3 + x^2 + x + 1$ |
| 241 | 361 | 11110001 | $x^7 + x^6 + x^5 + x^4 + 1$ |
| 247 | 367 | 11110111 | $x^7 + x^6 + x^5 + x^4 + x^2 + x + 1$ |
| 253 | 375 | 11111101 | $x^7 + x^6 + x^5 + x^4 + x^3 + x^2 + 1$ |

For example, referring to Table 5, in the case of using the primitive polynomial $x^7+x^3+1$ (represented as 131 using a decimal system, represented as 211 using an octal system, and represented as 10001001 using a binary system), the M-sequence may be generated according to the following Equation 1. In Equation 1, x(i) denotes the M-sequence and 0≤i≤126. Also, in Equation 1, x(ī+7) corresponds to $x^7$ in the primitive polynomial, x(ī+3) corresponds to $x^3$ in the primitive polynomial, and x(ī) corresponds to 1 in the primitive polynomial. Although initialization values x(0), x(1), x(2), x(3), x(4), x(5), and x(6) are expressed as 0, 0, 0, 0, 0, 0, and 1, respectively, in Equation 1, they are provided as an example only. That is, other initialization values may be used.

$$x(\bar{i}+7)=(x(\bar{i}+7)+x(\bar{i}+7)+x(\bar{i}))\bmod 2,\ 0\le\bar{i}\le 126,\ x(0)=0,$$
$$x(1)=0,\ x(2)=0,\ x(3)=0,\ x(4)=0,\ x(5)=0,\ x(6)=1 \quad \text{[Equation 1]}$$

If the generated M-sequence is represented using BPSK, the M-sequence may be modulated as represented by the following Equation 2. If a sequence value of the M-sequence=0, the value becomes 1 in response to BPSK modulation. If a sequence value of the M-sequence=1, the value becomes −1 in response to BPSK modulation.

$$\tilde{s}(i)=1-2x(i),\ 0\le i\le 126 \quad \text{[Equation 2]}$$

Finally, as represented by the following Equation 3, a total of 127 sequences are generated by cyclically shifting the sequence $\tilde{s}(i)$ of Equation 2 by m since a total of 127 values from 0 to 126 are available for a value of m. Therefore, $\tilde{s}(i)$ corresponds to an NR-SSS sequence that is mapped to each of consecutive 127 subcarriers on a frequency axis with respect to a single symbol within a substantially single SS block.

$$s^m(n)=\tilde{s}((n+m)\bmod 127),\ 0\le i\le 126 \quad \text{[Equation 3]}$$

A correlation value of the BPSK M-sequence generated in the aforementioned manner is represented as the following Equation 4. In Equation 4, if following examples of Equation 1 to Equation 3, N=127 corresponding to the length of the M-sequence. That is, as shown in Equation 4, a correlation value between sequences having the same cyclic shift (i.e., a correlation value with a corresponding sequence itself) is N, and otherwise, −1. That is, since the difference is great, the BPSK M-sequence may have a very excellent correlation characteristic.

$$R_s(\tau) = \sum_{n=0}^{N-1} s^m(n) \cdot s^{m+\tau}(n) = \begin{cases} N, & \tau = 0 \\ -1, & \tau \neq 0 \end{cases}$$ [Equation 4]

As described above, the BPSK M-sequence has an excellent correlation characteristic. However, considering a sequence with a length of 127 for mapping to a total of 127 subcarriers on a frequency, a total number of sequences is 127 and thus, limited. As described above, about 1000 NR PCIDs need to be classified. Here, although scrambling is applied based on three NR-PSSs with respect to each of the 127 NR-SSS sequences, a total of 127·3=381 different sequence combinations are present and about 1000 NR PCIDs may not be classified accordingly. Therefore, a method of generating a greater number of sequences is required.

To generate a greater number of sequences, a plurality of irreducible primitive polynomials may be used instead of using a single irreducible primitive polynomial as described above with reference to Equation 1 to Equation 3. To generate the M-sequence with the length of 127 as shown in Table 5, one of a total of 18 irreducible primitive polynomials may be used. Therefore, a maximum of K primitive polynomials may be used among a total of 18 primitive polynomials as follows.

If $x_0(i)$ refers to an M-sequence generated through a first primitive polynomial, $x_1(i)$ refers to an M-sequence generated through a second primitive polynomial, and, in this manner, $x_k(i)$ refers to an M-sequence generated through a (k+1)-th primitive polynomial, a total of 127·K sequences may be generated. Here, $0 \leq k \leq K-1$ and a maximum value of K is 18. Here, the (k+1)-th primitive polynomial may be one of 18 primitive polynomials of Table 5. Also, a method of generating an M-sequence $x_k(i)$ through each corresponding primitive polynomial may follow the method described above with reference to Equation 1.

If the generated M-sequence is represented using BPSK, modulation may be performed as represented by the following Equation 5. If a sequence value of the M-sequence=0, the value becomes 1 in response to BPSK modulation. If the sequence value of the M-sequence=1, the value becomes −1 in response to BPSK modulation.

$\tilde{s}_k(i) = 1 - 2x_k(i)$, $0 \leq i \leq 126$ [Equation 5]

As represented by Equation 6, a total of 127 sequences are generated by cyclically shifting the sequence $\tilde{s}_k(i)$ of Equation 5 by m since a total of 127 values from 0 to 126 are available for a value of m. Also, 127 sequences may be generated with respect to each k and a total of 127*K sequences may be finally generated. Here, $0 \leq k \leq K-1$ and a maximum value of K is 18. Therefore, $s^m(n)$ corresponds to an NR-SSS sequence that is mapped to each of consecutive 127 subcarriers on a frequency axis with respect to a single symbol within a substantially single SS block.

$s_k^m(n) = \tilde{s}_k((n+m) \bmod 127)$, $0 \leq i \leq 126$ [Equation 6]

A correlation value of the BPSK M-sequence generated in the aforementioned manner is represented as the following Equation 7. Here, a maximum absolute value (here, the maximum absolute value referring to a maximum absolute value among values excluding a correlation value with a corresponding sequence itself) of a correlation value according to Equation 7 is 41 of which a difference with 127 is not great compared to Equation 4 of which a corresponding value is 1 (1 if an absolute value is applied to −1). Therefore, a maximum of 127*K sequences may be generated, which may be sufficient to classify about 1000 NR PCIDs. However, a correlation characteristic may be poor.

$$R_{s_k,s_{k'}}(\tau) = \sum_{n=0}^{N-1} s_k^m(n) \cdot s_{k'}^{m+\tau}(n)$$ [Equation 7]

Here, in the case of generating an M-sequence based on a maximum connected set of the M-sequence instead of generating the M-sequence from each of a total of K primitive polynomials, sequences having a further excellent correlation characteristic may be generated. The maximum connected set of the M-sequence may have a total of 18 sets as shown in Table 6 with respect to the M-sequence with the length of 127. The primitive polynomials of Table 5 may be represented using an octal system as primitive polynomials of the following Table 6.

TABLE 6

| | Polynomial 1 | Polynomial 2 | Polynomial 3 | Polynomial 4 | Polynomial 5 | Polynomial 6 |
|---|---|---|---|---|---|---|
| set 1 | 211 | 217 | 277 | 323 | 203 | 253 |
| set 2 | 217 | 277 | 323 | 203 | 253 | 271 |
| set 3 | 277 | 323 | 203 | 253 | 271 | 367 |
| set 4 | 323 | 203 | 253 | 271 | 367 | 345 |
| set 5 | 203 | 253 | 271 | 367 | 345 | 221 |
| set 6 | 253 | 271 | 367 | 345 | 221 | 361 |
| set 7 | 271 | 367 | 345 | 221 | 361 | 375 |
| set 8 | 367 | 345 | 221 | 361 | 375 | 313 |
| set 9 | 345 | 221 | 361 | 375 | 313 | 301 |
| set 10 | 221 | 361 | 375 | 313 | 301 | 325 |
| set 11 | 361 | 375 | 313 | 301 | 325 | 235 |
| set 12 | 375 | 313 | 301 | 325 | 235 | 357 |
| set 13 | 313 | 301 | 325 | 235 | 357 | 247 |
| set 14 | 301 | 325 | 235 | 357 | 247 | 211 |
| set 15 | 325 | 235 | 357 | 247 | 211 | 217 |
| set 16 | 235 | 357 | 247 | 211 | 217 | 277 |
| set 17 | 357 | 247 | 211 | 217 | 277 | 323 |
| set 18 | 247 | 211 | 217 | 277 | 323 | 203 |

If $x_0(i)$ refers to an M-sequence generated through a first primitive polynomial, $x_1(i)$ refers to an M-sequence generated through a second primitive polynomial, and, in this manner, $x_k(i)$ refers to an M-sequence generated through a (k+1)-th primitive polynomial (here, $0 \leq k \leq K-1$), a maximum value of K is 6, which differs from the method described above with reference to Equation 5 and Equation 6. Here, the respective primitive polynomials need to be primitive polynomials belonging to the maximum connected set of the above Table 6.

For example, in the case of using a maximum connected set 1 of Table 6, a primitive polynomial needs to be represented as one of 211, 217, 277, 323, 203, and 253 in response to a representation using an octal system.

Hereinafter, a PCID and a synchronization signal in an NR system will be described.

In the NR system, the range of a PCID is from 0 to 1007 and may have one of 1008 distinguishable values. The PCID may be represented as $N_{ID}^{cell}$ and may be defined as $N_{ID}^{cell} = 3N_{ID}^{(1)} + N_{ID}^{(2)}$.

Here, $N_{ID}^{(1)}$ may have a single value of $\{0, 1, \ldots, 335\}$ and $N_{ID}^{(2)}$ may have a single value of $\{0, 1, 2\}$. That is, $N_{ID}^{(1)}$ may have a single value among 336 hypothesis values and $N_{ID}^{(2)}$ may have a single value among three hypothesis values.

$N_{ID}^{(1)}$ may be given by an NR-SSS and $N_{ID}^{(2)}$ may be given by an NR-PSS. That is, a base station that transmits a synchronization signal may determine values of $N_{ID}^{(1)}$ and $N_{ID}^{(2)}$ corresponding to a PCID value $N_{ID}^{cell}$ of the base station and may generate and transmit NR-SSS and NR-PSS sequences based on the respective determined values of $N_{ID}^{(1)}$ and $N_{ID}^{(2)}$. A UE that receives a synchronization signal for an initial cell selection may verify $N_{ID}^{(1)}$ and $N_{ID}^{(2)}$ from the detected NR-SSS sequence and NR-PSS sequence, respectively, and may determine a PCID of a corresponding cell based on $N_{ID}^{cell}=3N_{ID}^{(1)}+N_{ID}^{(2)}$.

Hereinafter, a process of generating NR-PSS and NR-SSS sequences is described.

Generation of a sequence $d_{PSS}(n)$ for an NR-PSS using an M-sequence may be represented as the following Equation 8.

$$d_{PSS}(n)=1-2x(m)$$

$$m=(n+43N_{ID}^{(2)})\bmod 127$$

$$0 \le n < 127 \quad \text{[Equation 8]}$$

where $$x(i+7)=(x(i+4)+x(i))\bmod 2$$

and $$[x(6)\, x(5)\, x(4)\, x(3)\, x(2)\, x(1)\, x(0)]=[1\ 1\ 1\ 0\ 1\ 1\ 0]$$

Referring to Equation 8, the NR-PSS may be generated using a frequency domain-based pure BPSK M-sequence. Also, three NR-PSSs may be acquired by applying three cyclic shift (CS) values in the frequency domain. That is, the CS value may be defined as CS=0 if $N_{ID}^{(2)}=0$, CS=43 if $N_{ID}^{(2)}=1$, and CS=86 if $N_{ID}^{(2)}=2$. Also, the NR-PSS sequence may have a length of 127 in the case of the frequency domain-based pure BPSK M-sequence.

Generation of a sequence $d_{PSS}(n)$ for an NR-SSS using an M-sequence may be represented as the following Equation 9.

$$d_{SSS}(n)=[1-2x_0((n+m_0)\bmod 127)][1-2x_1((n+m_1)\bmod 127)]$$

$$m_0=15\lfloor N_{ID}^{(1)}/112 \rfloor + 5N_{ID}^{(2)}$$

$$m_1=N_{ID}^{(1)} \bmod 112$$

$$0 \le n < 127 \quad \text{[Equation 9]}$$

where $$x_0(i+7)=(x_0(i+4)+x_0(i))\bmod 2$$

$$x_1(i+7)=(x_1(i+1)+x_1(i))\bmod 2$$

and $$[x_0(6)\, x_0(5)\, x_0(4)\, x_0(3)\, x_0(2)\, x_0(1)\, x_0(0)]=[0\ 0\ 0\ 0\ 0\ 0\ 1]$$

$$[x_1(6)\, x_1(5)\, x_1(4)\, x_1(3)\, x_1(2)\, x_1(1)\, x_1(0)]=[0\ 0\ 0\ 0\ 0\ 0\ 1]$$

Referring to Equation 9, the NR-SSS sequence may be generated using a single polynomial to which 112 cyclic shifts are applied and an additional single polynomial to which 9 cyclic shifts are applied.

Here, cyclic shift values $m_0$ and $m_1$ may be determined based on a cell ID (i.e., $N_{ID}^{cell}=3N_{ID}^{(1)}+N_{ID}^{(2)}$) extracted from the NR-PSS (i.e., $N_{ID}^{(2)}=0, 1, 2$) and the NR-SSS (i.e., $N_{ID}^{(1)}=0, 1, \ldots, 335$). For example, $m_0$ may have a single value among 9 cases including 0, 5, 10, 15, 20, 25, 30, 35, and 40, and $m_1$ may have a single value among 112 cases including 0 to 111. Accordingly, available combinations of $m_0$ and $m_1$ may correspond to a total of 1008 (=9*112) cell IDs (i.e., PCID).

The generated NR-PSS and NR-SSS sequences may be mapped on time-frequency resources of an SS block. The NR-PSS may be mapped on consecutive 127 subcarriers present in the middle of a frequency domain at a time location of a single specific symbol of the SS block, and the NR-SSS may be mapped on consecutive 127 subcarriers present in the middle of the frequency domain at a time location of another specific symbol of the SS block. In the example of FIG. 8, the NR-PSS sequence or the NR-SSS sequence is described to be mapped on 12 PRBs (=12*12=144 subcarriers). In detail, the NR-PSS sequence or the NR-SSS sequence is mapped on 127 subcarriers present in the middle of 144 subcarriers of 12 PRBs and the NR-PSS sequence or the NR-SSS sequence may not be mapped to 8 subcarriers corresponding to a low frequency and 9 subcarriers corresponding to a high frequency.

Hereinafter, a method and apparatus for setting and generating a sidelink synchronization signal sequence in a wireless communication system and a method and apparatus for transmitting and receiving a sidelink synchronization signal according to the present disclosure will be described.

Figure 9:
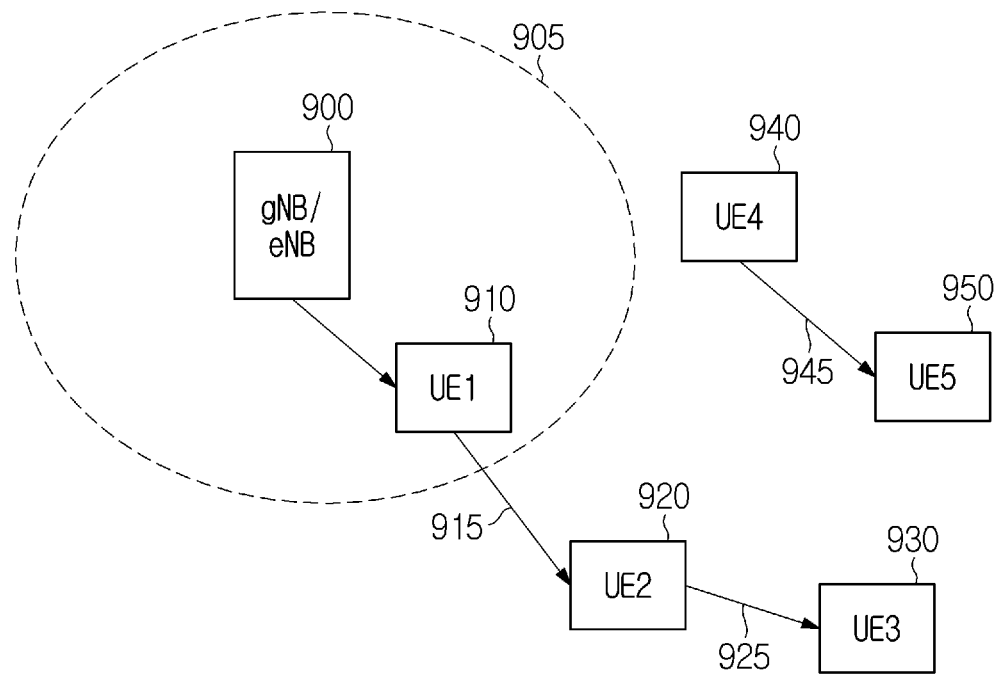
FIG. 9 illustrates an example of a sidelink synchronization reference according to the present disclosure.

FIG. 9 illustrates an example of a sidelink synchronization reference according to the present disclosure.

Referring to FIG. 9, it is assumed that, in a wireless communication system, a first UE (UE1) 910 is present in network coverage 905 of a base station 900, and a second UE (UE2) 920, a third UE (UE3) 930, a fourth UE (UE4) 940, and a fifth UE (UE5) 950 are present out of the network coverage 905.

Here, the wireless communication system may be a 5G network that supports LTE based technology (i.e., LTE and LTE enhanced radio access technology) as well as NR. Also, the base station 900 may be gNB or eNB. As described above, the wireless communication system of FIG. 9 may apply to all of a case in which an NR system independently operates and the NR system and an LTE based system operate together. Also, sidelink technology of the wireless communication system may include all of NR sidelink technology and LTE based sidelink technology.

Herein, a sidelink synchronization reference may be classified into a plurality of types. Also, a physical layer sidelink synchronization identity set for a corresponding sidelink synchronization signal may be distinguishably defined based on a type into which the sidelink synchronization reference is classified.

As a first example, a synchronization reference may be classified into two types based on whether a source of synchronization is an entity present in the network coverage 905 (i.e., an in-coverage entity) or an entity located out of the network coverage 905 (i.e., an out-of-coverage entity).

In detail, since the UE2 920 performs synchronization using a synchronization signal from the UE1 910 and the UE1 910 performs synchronization using a synchronization signal from the base station 900, the UE2 920 uses the in-coverage entity as a source of synchronization. The UE3 930 performs synchronization using a synchronization signal from the UE2 920, the UE2 920 performs synchronization using a synchronization signal from the UE1 910, and the UE1 910 performs synchronization using a synchronization signal from the base station 900. Accordingly, the UE3 930 uses the in-coverage entity as a source of synchronization. In this case, a synchronization reference of a sidelink 915 between the UE1 910 and the UE2 920 or a synchronization reference of a sidelink 925 between the UE2 920 and the UE3 930 may be referred to as a first type synchronization reference.

The UE5 950 present out of the coverage performs synchronization using a synchronization signal from the UE4 940 present out of the coverage. In this case, a synchronization reference of a sidelink 945 between the UE4 940 and the UE5 950 may be referred to as a second type synchronization reference.

A sidelink synchronization identity set corresponding to the first type synchronization reference may be referred to as id_net, and a sidelink synchronization identity set corresponding to the second type synchronization reference may be referred to as id_oon. That is, id_net may apply to the first sidelink 915 and the second sidelink 925 and id_oon may apply to the third sidelink 945.

As a second example, a synchronization reference may be classified into three types based on whether a source of synchronization is an in-coverage entity or an out-of-coverage entity, whether the synchronization signal is transmitted from the in-coverage entity to the out-of-coverage entity, or whether the synchronization signal is transmitted from the out-of-coverage entity to another out-of-coverage entity.

In detail, since the UE2 920 performs synchronization using a synchronization signal from the UE1 910 and the UE1 910 performs synchronization using a synchronization signal from the base station, the UE2 920 uses the in-coverage entity as a source of synchronization. Also, the UE1 910 is present in the coverage and the UE2 920 is present out of the coverage. In this case, a synchronization reference of the sidelink 915 between the UE1 910 and the UE2 920 may be referred to as a first type synchronization reference.

The UE3 930 performs synchronization using a synchronization signal from the UE2 920, the UE2 920 performs synchronization using a synchronization signal from the UE1 910, and the UE1 910 performs synchronization using a synchronization signal from the base station 900. Therefore, the UE3 930 uses the in-coverage entity as a source of synchronization. Also, all of the UE2 920 and the UE3 930 are present out of the coverage. In this case, a synchronization reference of the sidelink 925 between the UE2 920 and the UE3 930 may be referred to as a second type synchronization reference.

The UE5 950 present out of the coverage performs synchronization using a synchronization signal from the UE4 940 present out of the coverage. In this case, a synchronization reference of the sidelink 945 between the UE4 940 and the UE5 950 may be referred to as a third type synchronization reference.

A sidelink synchronization identity set corresponding to the first type synchronization reference may be referred to as id_net_1, a sidelink synchronization identity set corresponding to the second type synchronization reference may be referred to as id_net_2, and a sidelink synchronization identity set corresponding to the third type synchronization reference may be referred to as id_oon. That is, id_net_1 may apply to the first sidelink 915, id_net_2 may apply to the second sidelink 925, and id_oon may apply to the third sidelink 945.

As a third example, a synchronization reference may be classified into three types based on whether a source of synchronization is an in-coverage entity or an out-of-coverage entity and based on a type of radio access technology followed by the source of synchronization.

In detail, if a source of synchronization of the UE2 920 or the UE3 930 is an entity (e.g., gNB of an NR system) present in the coverage and according to a first type of radio access technology, a corresponding synchronization reference may be referred to as a first type synchronization reference. For example, if the base station 900 of FIG. 9 is gNB, a synchronization reference of the sidelink 915 between the UE1 910 and the UE2 920 or the sidelink 925 between the UE2 920 and the UE3 930 may be referred as a first type synchronization reference.

Alternatively, if a source of synchronization of the UE2 920 or the UE3 930 is an entity (e.g., eNB of an LTE based system) present in the coverage and according to a second type of radio access technology, a corresponding synchronization reference may be referred to as a second type synchronization reference. For example, if the base station 900 of FIG. 9 is eNB, a synchronization reference of the sidelink 915 between the UE1 910 and the UE2 920 or the sidelink 925 between the UE2 920 and the UE3 930 may be referred to as a second type synchronization reference.

The UE5 950 present out of the coverage performs synchronization using a synchronization signal from the UE4 940 present out of the coverage. In this case, a synchronization reference of the sidelink 945 between the UE4 940 and the UE5 950 may be referred to as a third type synchronization reference.

A sidelink synchronization identity set corresponding to the first type synchronization reference may be referred to as id_net_1, a sidelink synchronization identity set corresponding to the second type synchronization reference may be referred to as id_net_2, and a sidelink synchronization identity set corresponding to the third type synchronization reference may be referred to as id_oon. That is, id_net_1 may apply to the first sidelink 915, id_net_2 may apply to the second sidelink 925, and id_oon may apply to the third sidelink 945.

According to the present disclosure, two or three types may be defined for a type of a synchronization reference or a type of a physical layer sidelink synchronization identity set.

If the synchronization identity set is defined using two types, id_net that uses an in-coverage entity as a synchronization reference and id_oon that uses an out-of-coverage entity as a synchronization reference may be defined.

If the synchronization identity set is defined using three types, id_net_1 for a case in which an in-coverage entity is used for a synchronization reference and a sidelink synchronization signal is transmitted from the in-coverage entity to an out-of-coverage entity, id_net_2 for a case in which an in-coverage entity is used for a synchronization reference and a sidelink synchronization signal is transmitted from an out-of-coverage entity to another out-of-coverage entity, and id_oon that uses an out-of-coverage entity for a synchronization reference may be defined.

Alternatively, if the synchronization identity set is defined using three types, id_net_1 that uses, for a synchronization reference, an in-coverage entity according to a first type of radio access technology, id_net_2 that uses, for a synchronization reference, an in-coverage entity according to a second type of radio access technology, and id_oon that uses an out-of-coverage entity for a synchronization reference may be defined.

Figure 10:
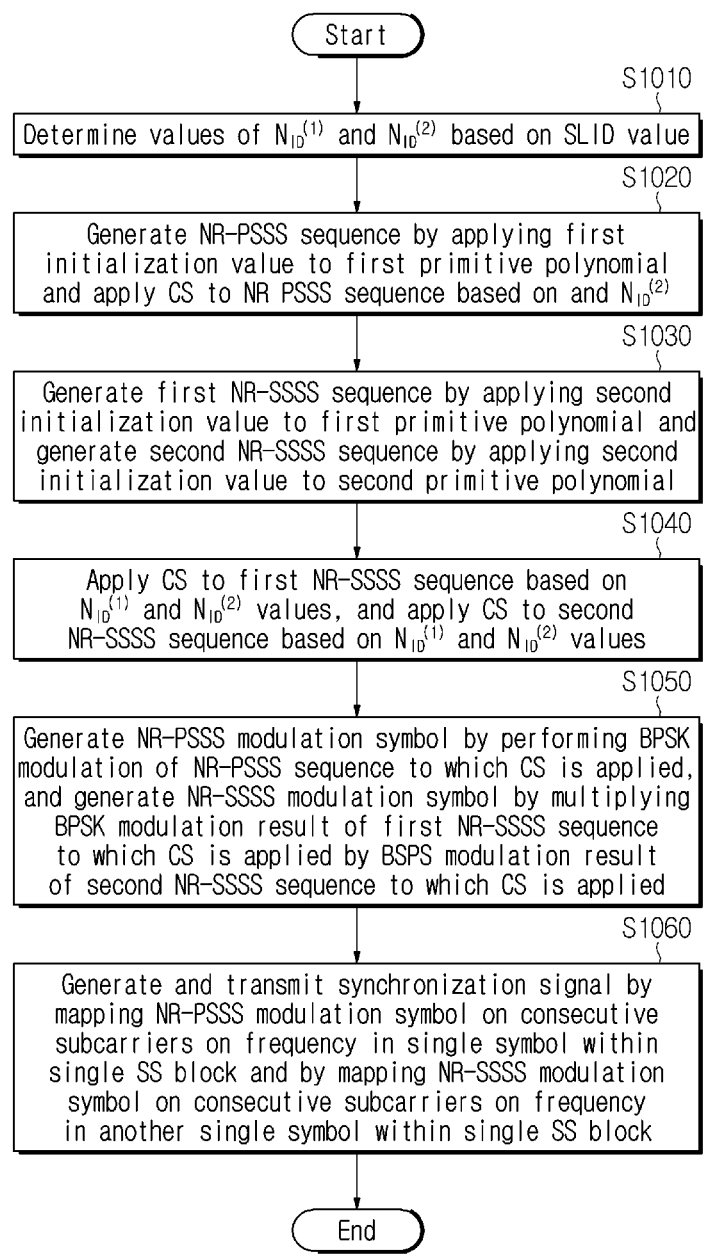
FIG. 10 is a flowchart illustrating an example of a method of transmitting a sidelink synchronization signal sequence according to the present disclosure.

FIG. 10 is a flowchart illustrating an example of a method of transmitting a sidelink synchronization signal sequence according to the present disclosure.

The sidelink synchronization signal transmitting method of FIG. 10 may be performed by a sidelink transmitting UE (hereinafter, a transmitting UE).

Referring to FIG. 10, in operation S1010, the transmitting UE may determine values of $N_{ID}^{(1)}$ and $N_{ID}^{(2)}$ based on sidelink identity (SLID) or $N_{ID}^{SL}$ corresponding to physical layer sidelink synchronization identity information.

Here, various examples of the present disclosure may include a case in which a physical layer sidelink synchronization identity set is configured using two types (e.g., id_net and id_oon in the example of FIG. 9) or a case in which the physical layer sidelink synchronization identity set is configured using three types (e.g., id_net_1, id_net_2, and id_oon in the example of FIG. 9).

Also, various examples of the present disclosure may include a case in which each type of the physical layer sidelink synchronization identity set (e.g., each of id_net and id_oon, or each of id_net_1, id_net_2, and id_oon in the example of FIG. 9) includes 168 sequences, a case in which each type thereof includes 336 sequences, a case in which each type thereof includes 504 sequences, or a case in which each type thereof includes 1008 sequences.

As described above, values of $N_{ID}^{(1)}$ and $N_{ID}^{(2)}$ corresponding to an SLID value may be determined based on a number of types of a physical layer sidelink synchronization identity sets and a number of synchronization signal sequences included in each type of the identity set.

In operation S1020, the transmitting UE may generate an NR-primary sidelink synchronization signal (PSSS) sequence by applying a first initialization value to a first primitive polynomial. Also, the transmitting UE may determine a cyclic shift (CS) value to be applied to the generated NR-PSSS sequence based on the value of $N_{ID}^{(2)}$ and may apply CS to the NR-PSSS sequence.

Here, in various examples of the present disclosure, an NR sidelink synchronization signal sequence may be distinguished from an NR downlink synchronization signal sequence by applying a first primitive polynomial used to generate an NR-PSSS sequence to be distinguished from a first primitive polynomial applied to the NR downlink synchronization signal sequence.

Also, in various examples of the present disclosure, an NR sidelink synchronization signal sequence may be distinguished from an NR downlink synchronization signal sequence by applying a CA value for an NR-PSSS distinguished from a CS value applied to the NR downlink synchronization signal sequence.

In operation S1030, the transmitting UE may generate a first NR-secondary sidelink synchronization signal (NR-SSSS) sequence by applying a second initialization value to the first primitive polynomial and may generate a second NR-SSSS sequence by applying the second initialization value to the second primitive polynomial.

Here, in various examples of the present disclosure, an NR sidelink synchronization signal sequence may be distinguished from an NR downlink synchronization signal sequence by applying at least one of first and second primitive polynomials used to generate an NR-SSSS sequence to be distinguished from at least one of first and second primitive polynomials applied to the NR downlink synchronization signal sequence.

In operation S1040, the transmitting UE may determine a CS value to be applied to the generated first NR-SSSS sequence based on the values of $N_{ID}^{(1)}$ and $N_{ID}^{(2)}$ and may apply CS to the first NR-SSSS sequence. Also, the transmitting UE may determine a CS value to be applied to the generated second NR-SSSS sequence based on the values of $N_{ID}^{(1)}$ and $N_{ID}^{(2)}$ and may apply CS to the second NR-SSSS sequence.

Here, in various examples of the present disclosure, an NR sidelink synchronization signal sequence may be distinguished from an NR downlink synchronization signal sequence by applying at least one of a CS value for a first NR-SSSS sequence and a CS value for a second NR-SSSS sequence to be distinguished from a CS value applied to the NR downlink synchronization signal sequence.

In operation S1050, the transmitting UE may generate an NR-PSSS modulation symbol by performing BPSK modulation of the NR-PSSS sequence to which the CS is applied. Also, the transmitting UE may generate an NR-SSSS modulation symbol by multiplying a BPSK modulation result of the first NR-SSSS sequence to which the CS is applied by a BPSK modulation result of the second NR-SSSS sequence to which the CS is applied.

In operation S1060, the transmitting UE may map the NR-PSSS modulation symbol on consecutive subcarriers on a frequency in a single symbol within a single SS block and may map the NR-SSSS modulation symbol on consecutive subcarriers on the frequency in another symbol within the single SS block. The transmitting UE may generate and transmit a synchronization signal based on a modulation symbol mapped on time-frequency resources.

Figure 11:
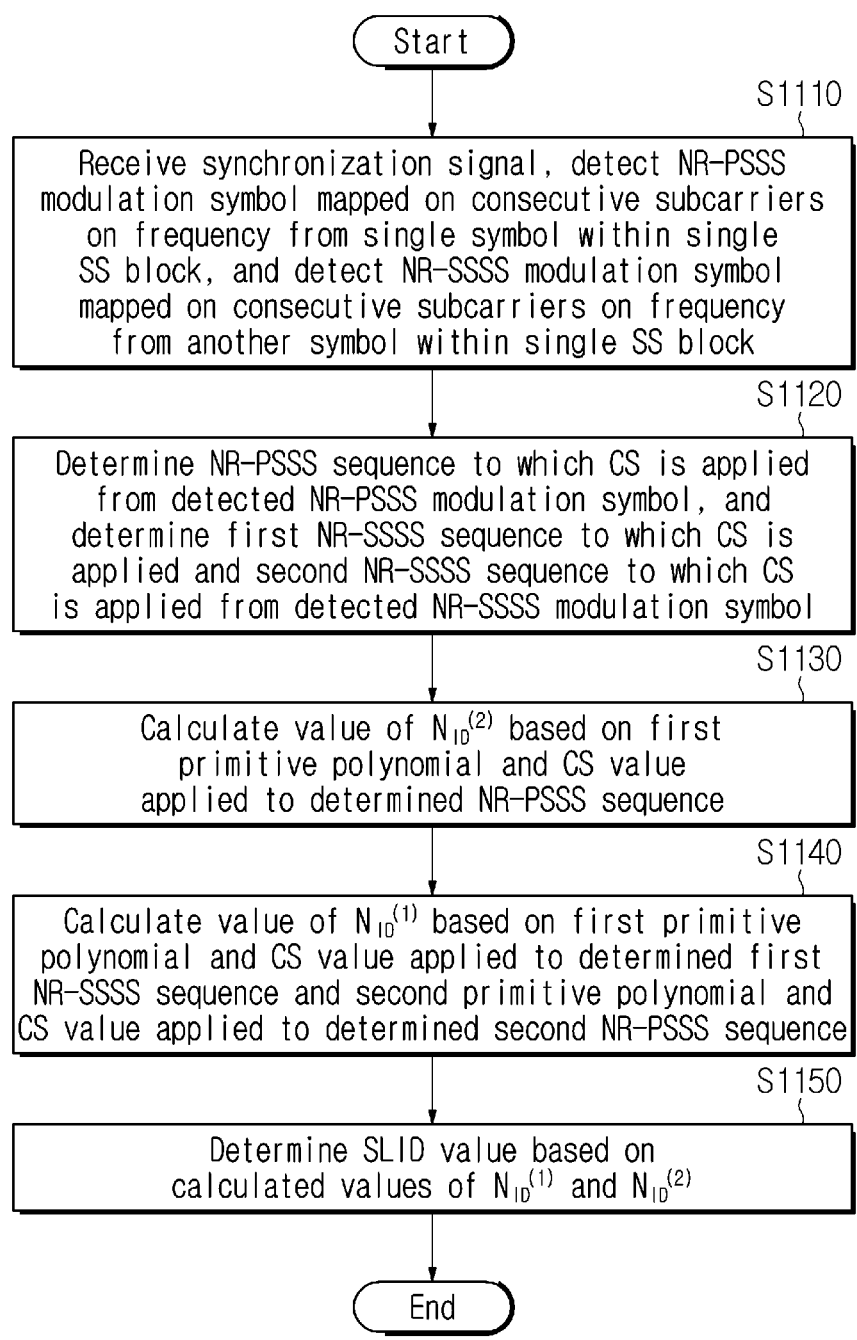
FIG. 11 is a flowchart illustrating an example of a method of receiving a sidelink synchronization signal sequence according to the present disclosure.

FIG. 11 is a flowchart illustrating an example of a method of receiving a sidelink synchronization signal sequence according to the present disclosure.

The sidelink synchronization signal receiving method of FIG. 11 may be performed by a sidelink receiving UE (hereinafter, a receiving UE).

Referring to FIG. 11, in operation S1110, the receiving UE may receive a synchronization signal from a transmitting UE. The receiving UE may detect, from the synchronization signal, an NR-PSSS modulation symbol mapped on consecutive subcarriers on a frequency in a single symbol within a single SS block, and may detect an NR-SSSS modulation symbol mapped on consecutive subcarriers on the frequency in another symbol within the single SS block.

In operation S1120, the receiving UE may determine an NR-PSSS sequence to which CS is applied from the detected NR-PSSS modulation symbol. Also, the receiving UE may determine a first NR-SSSS sequence to which the CS is applied and a second NR-SSSS sequence to which the CS is applied from the detected NR-SSSS modulation symbol.

In operation S1130, the receiving UE may calculate a value of $N_{ID}^{(2)}$ based on a first primitive polynomial and a CS value applied to the determined NR-PSSS sequence.

Here, in various examples of the present disclosure, an NR sidelink synchronization signal sequence may be distinguished from an NR downlink synchronization signal sequence by applying a first primitive polynomial used to generate an NR-PSSS sequence to be distinguished from a first primitive polynomial applied to the NR downlink synchronization signal sequence.

Also, in various examples of the present disclosure, an NR sidelink synchronization signal sequence may be distinguished from an NR downlink synchronization signal sequence by applying a CS value for an NR-PSSS sequence to be distinguished from a CS value applied to the NR downlink synchronization signal sequence.

The receiving UE may be pre-aware of a first primitive polynomial and a candidate CS value applicable to generate the NR-PSSS sequence. Therefore, the receiving UE may verify a CS value applied to a corresponding NR-PSSS sequence from the NR-PSSS sequence determined in operation S1120 and may calculate a value of $N_{ID}^{(2)}$ value from the verified CS value.

In operation S1140, the receiving UE may calculate a value of $N_{ID}^{(1)}$ based on the CS value applied to the determined first NR-SSSS sequence and the CS value applied to the second NR-SSSS sequence.

Here, in various examples of the present disclosure, an NR sidelink synchronization signal sequence may be distinguished from an NR downlink synchronization signal sequence by applying at least one of first and second primitive polynomials used to generate an NR-SSSS sequence to be distinguished from at least one of first and second primitive polynomials applied to the NR downlink synchronization signal sequence.

Also, in various examples of the present disclosure, an NR sidelink synchronization signal sequence may be distinguished from an NR downlink synchronization signal sequence by applying at least one of a CS value for a first NR-SSSS sequence and a CS value for a second NR-SSSS sequence to be distinguished from a CS value applied to the NR downlink synchronization signal sequence.

The receiving UE may be pre-aware of first and second primitive polynomials and a candidate CS value applicable to generate the first and second NR-SSSS sequences. Therefore, the receiving UE may verify a CS value applied to each NR-PSSS sequence from each of the first and second NR-SSSS sequences determined in operation S1120, and may calculate the value of $N_{ID}^{(1)}$ from the verified CS value and the value of $N_{ID}^{(2)}$ calculated in operation S1130.

In operation S1150, the receiving UE may determine an SLID (or $N_{ID}^{SL}$) value from the calculated values of $N_{ID}^{(1)}$ and $N_{ID}^{(2)}$.

Here, various examples of the present disclosure may include a case in which a physical layer sidelink synchronization identity set is configured using two types (e.g., id_net and id_oon in the example of FIG. 9) or a case in which the physical layer sidelink synchronization identity set is configured using three types (e.g., id_net_1, id_net_2, and id_oon in the example of FIG. 9).

Also, various examples of the present disclosure may include a case in which each type of the physical layer sidelink synchronization identity set (e.g., each of id_net and id_oon, or each of id_net_1, id_net_2, and id_oon in the example of FIG. 9) includes 168 sequences, a case in which each type thereof includes 336 sequences, a case in which each type thereof includes 504 sequences, or a case in which each type thereof includes 1008 sequences.

The receiving UE may be pre-aware of a number of types of a physical layer sidelink synchronization identity set and a number of synchronization signal sequences included in each type of the identity set and thus, may determine an SLID value corresponding to the values of $N_{ID}^{(1)}$ and $N_{ID}^{(2)}$.

Hereinafter, various examples of the present disclosure will be further described.

The examples of the present disclosure may include various combinations of an example about a number of types of a physical layer sidelink synchronization identity set (i.e., example A series), an example about a number of sequences included in each type of a physical layer sidelink synchronization identity set (i.e., example B series), an example about a type of an NR sidelink synchronization signal sequence resource used to distinguish an NR sidelink synchronization signal sequence from an NR downlink synchronization signal sequence (i.e., example C series).

Example A series may include a case (example A1) in which a physical layer sidelink synchronization identity set is configured using two types and a case (example A2) in which a physical layer sidelink synchronization identity set is configured using three types.

Example B series may include a case (example B1) in which each type of a physical layer sidelink synchronization identity set includes 168 sequences, a case (example B2) in which each type thereof includes 336 (=168*2) sequences, a case (example B3) in which each type thereof includes 504 sequences, and a case (example B4) in which each type thereof includes 1008 (=504*2) sequences.

Example C series may include a case (example C1) in which a type of an NR sidelink synchronization signal sequence resource used to distinguish an NR sidelink synchronization signal sequence from an NR downlink synchronization signal sequence is a CS value applied to an NR-PSSS, a case (example C2) in which a type thereof is a CS value applied to an NR-SSSS, a case (example C3) in which a type thereof is a primitive polynomial included in an NR-PSSS, and a case (example C4) in which a type thereof is a primitive polynomial applied to an NR-SSSS.

Further, example C series may further include an example corresponding to a combination of at least two of C1 to C4.

For example, a CS value applied to an NR-PSSS may be defined to be distinguished from a CS value applied to an NR downlink PSS, and a CS value applied to an NR-SSSS may be defined to be distinguished from a CS value applied to an NR downlink SSS.

Alternatively, a primitive polynomial applied to an NR-PSSS may be defined to be distinguished from a primitive polynomial applied to an NR downlink PSS, and a primitive polynomial applied to an NR-SSSS may be defined to be distinguished from a primitive polynomial applied to an NR downlink SSS.

Alternatively, a primitive polynomial applied to the NR-PSSS may be defined to be distinguished from a primitive polynomial applied to the NR downlink PSS, and a CS value applied to an NR-SSSS may be defined to be distinguished from a CS value applied to an NR downlink SSS.

Alternatively, a CS value applied to an NR-PSSS may be defined to be distinguished from a CS value applied to an NR downlink PSS, and a primitive polynomial applied to an NR-SSSS may be defined to be distinguished from a primitive polynomial applied to an NR downlink SSS.

Alternatively, a primitive polynomial and a CS value applied to an NR-PSSS and a primitive polynomial and a CS value applied to an NR-SSSS may be defined to be distinguished from a primitive polynomial and a CS value applied to an NR downlink PSS and a primitive polynomial and a CS value applied to an NR downlink SSS.

As described above, various examples of the present disclosure may include any possible combination of one of example A series, one of example B series, and one of example C series. For example, when an NR sidelink synchronization signal is defined to be generated based on a rule corresponding to a single combination, the transmitting UE may generate and transmit NR-PSSS and NR-SSSS sequences corresponding to an SLID according to the rule, and the receiving UE may determine the SLID by processing the received NR-PSSS and NR-SSSS sequences.

Hereinafter, examples of combinations of example A series, example B series, and example C series will be further described.

EXAMPLES A1 AND B1

A physical layer sidelink synchronization identity set may be defined into two types, that is, id_net and id_oon, and each of id_net and id_oon may include 168 sequences and may be defined as follows:

id_net={0, 1, ..., 167}
id_oon={168, 169, ..., 335}
$N_{ID}^{SL}$={0, 1, ..., 335}
$N_{ID}^{(1)}=N_{ID}^{SL}$ mod 168
$N_{ID}^{(2)}$=int($N_{ID}^{SL}$/168), $N_{ID}^{(2)}$={0, 1}

EXAMPLES A1, B1, AND C1

Sidelink PSS Resource (Example C1-PSS)

A primitive polynomial and an initialization value for a sidelink PSS may be applied to be identical to those for a downlink PSS. Here, a CS value for the sidelink PSS may be applied to be different from a CS value for the downlink PSS.

For example, although the same primitive polynomial and initialization value as Equation 8 apply to the sidelink PSS, the CS value for the sidelink PSS may be defined as CS=0+k if $N_{ID}^{(2)}$=0 and CS=43+k if $N_{ID}^{(2)}$=1 as represented by the following Equation 10. Here, although a value of k=21 or 22 may be given, it is provided as an example only.

$d_{PSS}(n)=1 \times 2x(m)$ $m=(n+43N_{ID}^{(2)}+k)$mod127

$0 \leq n < 127$  [Equation 10]

Accordingly, a value distinguished from the CS value applied to the downlink PSS and corresponding to a farthest distance (e.g., as far as k) may be applied as the CS value applied to the sidelink PSS.

Sidelink SSS Resource (Example C1-SSS)

A primitive polynomial and an initialization value for a sidelink SSS may be applied to be identical to those for a downlink SSS. Here, a CS value for the sidelink SSS may use a portion of CS values for the downlink SSS.

That is, the primitive polynomial of Equation 9 may apply to the sidelink SSS and a portion of $m_0$={0, 5, 10, 15, 20, 25, 30, 35, 40} and $m_1$={0, 1, ..., 111} may be used for the CS value for the sidelink SSS.

For example, as shown in the following Equation 11, $m_0$={0, 5, 15, 20} may be used. Here, $m_1$={0, 1, ..., 111} may be used for $m_0$={0, 5}, and $m_1$={0, 1, ..., 55} may be used for $m_0$={15, 20}. Therefore, a number of possible combinations of $m_0$ and $m_1$ may correspond to a total of 336 (=2*112+2*56) SLIDs.

$d_{SSS}(n)=[1-2x_0((n+m_0)$mod127$)][1-2x_1((n+m_1)$mod127$)]$ $m_0=15\lfloor N_{ID}^{(1)}/112 \rfloor+5N_{ID}^{(2)}$ $m_1=N_{ID}^{(1)}$ mod112

$0 \leq n < 127$  [Equation 11]

As an additional example, as shown in the following Equation 12, $m_0$={0, 5, 10, 15} may be used. Here, $m_1$={0, 1, ..., 111} may be used for $m_0$={0, 5} and $m_1$={0, 1, ..., 55} may be used for $m_0$={10, 15}. Therefore, a number of possible combinations of $m_0$ and $m_1$ may correspond to a total of 336 (=2*112+2*56) SLIDs.

$d_{SSS}(n)=[1-2x_0((n+m_0)$mod127$)][1-2x_1((n+m_1)$mod127$)]$ $m_0=10\lfloor N_{ID}^{(1)}/112 \rfloor+5N_{ID}^{(2)}$ $m_1=N_{ID}^{(1)}$ mod112

$0 \leq n < 127$  [Equation 12]

As an additional example, as shown in the following Equation 13, $m_0$={0, 5, 15, 20} and $m_1$={0, 1, ..., 83} may be used. Therefore, a number of possible combinations of $m_0$ and $m_1$ may correspond to a total of 336 (=4*84) SLIDs.

$d_{SSS}(n)=[1-2x_0((n+m_0)$mod127$)][1-2x_1((n+m_1)$mod127$)]$ $m_0=15\lfloor N_{ID}^{(1)}/84 \rfloor+5N_{ID}^{(2)}$ $m_1=N_{ID}^{(1)}$ mod84

$0 \leq n < 127$  [Equation 13]

As an additional example, as shown in the following Equation 14, $m_0$={0, 5, 10, 15} and $m_1$={0, 1, ..., 83} may be used. Therefore, a number of possible combinations of $m_0$ and $m_1$ may correspond to a total of 336 (=4*84) SLIDs.

$d_{SSS}(n)=[1-2x_0((n+m_0)$mod127$)][1-2x_1((n+m_1)$mod127$)]$ $m_0=10\lfloor N_{ID}^{(1)}/84 \rfloor+5N_{ID}^{(2)}$ $m_1=N_{ID}^{(1)}$ mod84

$0 \leq n < 127$  [Equation 14]

EXAMPLES A1, B1, AND C2

Sidelink PSS Resource (Example C2-PSS)

A primitive polynomial and an initialization value for a sidelink PSS may be applied to be identical to those for a downlink PSS. Here, a CS value for the sidelink PSS may use a portion of CS values for the downlink PSS.

For example, although the same primitive polynomial and initialization value as Equation 8 apply to the sidelink PSS, the CS value for the sidelink PSS may be defined as CS=0 if $N_{ID}^{(2)}$=0 and CS=43 if $N_{ID}^{(2)}$=1.

Sidelink SSS Resource (Example C2-SSS)

A primitive polynomial and an initialization value for a sidelink SSS may be applied to be identical to those for a downlink SSS. Here, a CS value for the sidelink SSS may be applied to be different from a CS value for the downlink SSS.

That is, the primitive polynomial of Equation 9 may apply to the sidelink SSS and the CS value may be applied to be different from the CS value of the downlink SSS as follows.

For example, as shown in the following Equation 15, $m_0$={0+k, 5+k, 15+k, 20+k} may be used. Here, $m_1$={0, 1, ..., 111} may be used for $m_0$={0+k, 5+k} and $m_1$={0, 1, ..., 55} may be used for $m_0$={15+k, 20+k}. Therefore, a number of possible combinations of $m_0$ and $m_1$ may correspond to a total of 336 (=2*112+2*56) SLIDs. Here, although a value of k=45 may be given, it is provided as an example only. For example, k may be a value that satisfies 20+k<112 among multiples of 5, greater than 40 (e.g., one of k={45, 50, 55, ..., 90}).

$d_{SSS}(n)=[1-2x_0((n+m_0)$mod127$)][1-2x_1((n+m_1)$mod127$)]$ $m_0=15+5N_{ID}^{(2)}+k$ $m_1=N_{ID}^{(1)}$ mod112

$0 \leq n < 127$  [Equation 15]

As an additional example, as shown in the following Equation 16, $m_0$={0+k, 5+k, 10+k, 15+k} may be used. Here, $m_1$={0, 1, ..., 111} may be used for $m_0$={0+k, 5+k} and $\lfloor N_{ID}^{(1)}/112 \rfloor m_1$={0, 1, ..., 55} may be used for $m_0=\{10+k, 15+k\}$. Therefore, a number of possible combinations of $m_0$ and $m_1$ may correspond to a total of 336 (=2*112+2*56) SLIDs. Here, although a value of k=45 may be given, it is provided as an example only. For example, k may be a value that satisfies 15+k<112 among multiples of 5, greater than 40 (e.g., one of k={45, 50, 55, . . . , 95}).

$$d_{SSS}(n)=[1-2x_0((n+m_0)\bmod 127)][1-2x_1((n+m_1)\bmod 127)]$$

$$m_0=10\lfloor N_{ID}^{(1)}/112\rfloor+5N_{ID}^{(2)}$$

$$m_1=N_{ID}^{(1)}\bmod 112$$

$$0\leq n<127 \quad\quad\quad \text{[Equation 16]}$$

As an additional example, as shown in the following Equation 17, $m_0=\{0+k, 5+k, 15+k, 20+k\}$ and $m_1=\{0, 1, \ldots, 83\}$ may be used. Therefore, a number of possible combinations of $m_0$ and $m_1$ may correspond to a total of 336 (=4*84) SLIDs. Here, although a value of k=45 may be given, it is provided as an example only. For example, k may be a value that satisfies 20+k<112 among multiples of 5, greater than 40 (e.g., one of k={45, 50, 55, . . . , 90}).

$$d_{SSS}(n)=[1-2x_0((n+m_0)\bmod 127)][1-2x_1((n+m_1)\bmod 127)]$$

$$m_0=15\lfloor N_{ID}^{(1)}/84\rfloor+5N_{ID}^{(2)}+k$$

$$m_1=N_{ID}^{(1)}\bmod 84$$

$$0\leq n<127 \quad\quad\quad \text{[Equation 17]}$$

As an additional example, as shown in the following Equation 18, $m_0=\{0+k, 5+k, 10+k, 15+k\}$ and $m_1=\{0, 1, \ldots, 83\}$ may be used. Therefore, a number of possible combinations of $m_0$ and $m_1$ may correspond to a total of 336 (=4*84) SLIDs. Here, although a value of k=45 may be given, it is provided as an example only. For example, k may be a value that satisfies 15+k<112 among multiples of 5, greater than 40 (e.g., one of k={45, 50, 55, . . . , 95}).

$$d_{SSS}(n)=[1-2x_0((n+m_0)\bmod 127)][1-2x_1((n+m_1)\bmod 127)]$$

$$m_0=10\lfloor N_{ID}^{(1)}/84\rfloor+5N_{ID}^{(2)}+k$$

$$m_1=N_{ID}^{(1)}\bmod 84$$

$$0\leq n<127 \quad\quad\quad \text{[Equation 18]}$$

Accordingly, a value distinguished from the CS value applied to the downlink SSS and corresponding to a farthest distance (e.g., as far as k) may be applied as the CS value applied to the sidelink SSS.

EXAMPLES A1, B1, AND C3

Sidelink PSS Resource (Example C3-PSS)

As shown in Equation 8 and Equation 9, one (e.g., a polynomial corresponding to octal 221 of Table 5) of first and second primitive polynomials (e.g., polynomials corresponding to octal 221 and 203 of Table 5) for a downlink SSS may be used as a primitive polynomial for a downlink PSS.

A primitive polynomial for a sidelink PSS may use another single primitive polynomial (e.g., a polynomial corresponding to octal 203 of Table 5) distinguished from the primitive polynomial applied to the downlink PSS among first and second primitive polynomials for a sidelink SSS.

In this case, an initialization value for a sidelink PSS primitive polynomial may be applied to be identical to an initialization value for a downlink PSS primitive polynomial. Alternatively, another single initialization value may be applied.

For example, the primitive polynomial for the sidelink PSS may be defined as represented by the following Equation 19.

$$x(i+7)=(x(i+1)+x(i))\bmod 2$$

$$[x(6)\ x(5)\ x(4)\ x(3)\ x(2)\ x(1)\ x(0)]=[1\ 1\ 1\ 0\ 1\ 1\ 0] \quad \text{[Equation 19]}$$

Here, a CS value for the sidelink PSS may use a portion of CS values for the downlink PSS. For example, the CS value for the sidelink PSS may be defined as CS=0 if $N_{ID}^{(2)}=0$ and CS=43 if $N_{ID}^{(2)}=1$.

Sidelink SSS Resource (Example C3-SSS)

Although a primitive polynomial for a sidelink SSS may use the same polynomial as that for a downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively.

For example, the first and second primitive polynomials for the sidelink SSS may be defined as the following Equation 20.

$$x_0(i+7)=(x_0(i+1)+x_0(i))\bmod 2$$

$$x_1(i+7)=(x_1(i+4)+x_1(i))\bmod 2$$

$$[x_0(6)\ x_0(5)\ x_0(4)\ x_0(3)\ x_0(2)\ x_0(1)\ x_0(0)]=[0\ 0\ 0\ 0\ 0\ 0\ 1]$$

$$[x_1(6)\ x_1(5)\ x_1(4)\ x_1(3)\ x_1(2)\ x_1(1)\ x_1(0)]=[0\ 0\ 0\ 0\ 0\ 0\ 1] \quad \text{[Equation 20]}$$

In this case, an initialization value for a sidelink SSS primitive polynomial may be applied to be identical to an initialization value for a downlink SSS primitive polynomial. Alternatively, another single initialization value may be applied.

Here, a CS value for the sidelink SSS may use a portion of CS values for the downlink SSS.

That is, the primitive polynomial of Equation 20 may be applied to the sidelink SSS and a portion of $m_0=\{0, 5, 10, 15, 20, 25, 30, 35, 40\}$ and $m_1=\{0, 1, \ldots, 111\}$ may be used as the CS value for the sidelink SSS.

For example, as shown in the above Equation 11, $m_0=\{0, 5, 15, 20\}$ may be used. Here, $m_1=\{0, 1, \ldots, 111\}$ may be used for $m_0=\{0, 5\}$ and $m_1=\{0, 1, \ldots, 55\}$ may be used for $m_0=\{15, 20\}$. Therefore, a number of possible combinations of $m_0$ and $m_1$ may correspond to a total of 336 (=2*112+2*56) SLIDs.

As an additional example, as shown in the above Equation 12, $m_0=\{0, 5, 10, 15\}$ may be used. Here, $m_1=\{0, 1, \ldots, 111\}$ may be used for $m_0=\{0, 5\}$, and $m_1=\{0, 1, \ldots, 55\}$ may be used for $m_0=\{10, 15\}$. Therefore, a number of possible combinations of $m_0$ and $m_1$ may correspond to a total of 336 (=2*112+2*56) SLIDs.

As an additional example, as shown in the above Equation 13, $m_0=\{0, 5, 15, 20\}$ and $m_1=\{0, 1, \ldots, 83\}$ may be used. Therefore, a number of possible combinations of $m_0$ and $m_1$ may correspond to a total of 336 (=4*84) SLIDs.

As an additional example, as shown in the above Equation 14, $m_0=\{0, 5, 10, 15\}$ and $m_1=\{0, 1, \ldots, 83\}$ may be used.

Therefore, a number of possible combinations of $m_0$ and $m_1$ may correspond to a total of 336 (=4*84) SLIDs.

EXAMPLES A1, B1, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, the first and second primitive polynomials used for the downlink PSS and the downlink SSS and the first and second primitive polynomials used for the sidelink PSS and the sidelink SSS may not overlap.

For example, primitive polynomials used for the sidelink PSS and the sidelink SSS may be defined as primitive polynomials belonging to the same maximum connected set (see Table 6).

Sidelink PSS Resource (Example C4-PSS)

As a primitive polynomial for a sidelink PSS, one of remaining primitive polynomials excluding primitive polynomials used for a downlink PSS and a downlink SSS from among polynomials belonging to set 5 included in primitive polynomials (221 and 203 represented using an octal system) used for the downlink PSS and the downlink SSS in the maximum connected set of Table 6 may be selected. For example, one of polynomials 253, 271, 367, and 345 represented using an octal system may be selected as the primitive polynomial for the sidelink PSS.

For example, as shown in the following Equation 21, a polynomial corresponding to octal 253 may be applied as the primitive polynomial for the sidelink PSS. In this case, an initialization value for a sidelink PSS primitive polynomial may be applied to be identical to an initialization value for a downlink PSS primitive polynomial. Alternatively, another single initialization value may be applied.

$x(i+7)=(x(i+5)+x(i+3)+x(i+1)+x(i))\mod 2$ $[x(6)\ x(5)\ x(4)\ x(3)\ x(2)\ x(1)\ x(0)]=[1\ 1\ 1\ 0\ 1\ 1\ 0]$ [Equation 21]

Here, a CS value for the sidelink PSS may use a portion of CS values for the downlink PSS. For example, the CS value for the sidelink PSS may be defined as CS=0 if $N_{ID}^{(2)}=0$ and CS=43 if $N_{ID}^{(2)}=1$.

Sidelink SSS Resource (Example C4-SSS)

The same primitive polynomial as a primitive polynomial for a sidelink PSS may be selected as a first primitive polynomial for a sidelink SSS, and one of polynomials belonging to the same maximum connected set to that of the first primitive polynomial may be selected as a second primitive polynomial for the sidelink SSS.

For example, a single polynomial applied to the sidelink PSS among polynomials corresponding to octal 253, 271, 367, and 345 belonging to the maximum connected set 5 of Table 6 and a remaining single polynomial among the polynomials may be applied as primitive polynomials for the sidelink SSS. For example, if a polynomial corresponding to octal 253 is applied to the sidelink PSS, 253 and 271, 253 and 367, or 253 and 345 may be applied as the first and second primitive polynomials for the sidelink SSS.

For example, as shown in the following Equation 22, polynomials corresponding to octal 253 and 271 may be applied as the first and second primitive polynomials for the sidelink SSS. In this case, an initialization value for a sidelink PSS primitive polynomial may be applied to be identical to an initialization value for a downlink SSS primitive polynomial. Alternatively, another single initialization value may be applied.

$x_0(i+7)=(x_0(i+5)+x_0(i+3)+x_0(i+1)+x_0(i))\mod 2$ $x_1(i+7)=(x_1(i+5)+x_1(i+4)+x_1(i+3)+x_1(i))\mod 2$ $[x_0(6)\ x_0(5)\ x_0(4)\ x_0(3)\ x_0(2)\ x_0(1)\ x_0(0)]=[0\ 0\ 0\ 0\ 0\ 0\ 1]$ $[x_1(6)\ x_1(5)\ x_1(4)\ x_1(3)\ x_1(2)\ x_1(1)\ x_1(0)]=[0\ 0\ 0\ 0\ 0\ 0\ 1]$ [Equation 22]

Here, a CS value for the sidelink SSS may use a portion of CS values for the downlink SSS.

That is, the first and second primitive polynomials as shown in Equation 22 or an additional example may be applied to the sidelink SSS, and a portion of $m_0=\{0, 5, 10, 15, 20, 25, 30, 35, 40\}$ and $m_1=\{0, 1, \ldots, 111\}$ may be used as the CS value for the sidelink SSS.

For example, as shown in the above Equation 11, $m_0=\{0, 5, 15, 20\}$ may be used. Here, $m_1=\{0, 1, \ldots, 111\}$ may be used for $m_0=\{0, 5\}$ and $m_1=\{0, 1, \ldots, 55\}$ may be used for $m_0=\{15, 20\}$. Therefore, a number of possible combinations of $m_0$ and $m_1$ may correspond to a total of 336 (=2*112+2*56) SLIDs.

As an additional example, as shown in the above Equation 12, $m_0=\{0, 5, 10, 15\}$ may be used. Here, $m_1=\{0, 1, \ldots, 111\}$ may be used for $m_0=\{0, 5\}$ and $m_1=\{0, 1, \ldots, 55\}$ may be used for $m_0=\{10, 15\}$. Therefore, a number of possible combinations of $m_0$ and $m_1$ may correspond to a total of 336 (=2*112+2*56) SLIDs.

As an additional example, as shown in the above Equation 13, $m_0=\{0, 5, 15, 20\}$ and $m_1=\{0, 1, \ldots, 83\}$ may be used. Therefore, a number of possible combinations of $m_0$ and $m_1$ may correspond to a total of 336 (=4*84) SLIDs.

As an additional example, as shown in Equation 14, $m_0=\{0, 5, 10, 15\}$ and $m_1=\{0, 1, \ldots, 83\}$ may be used. Therefore, a number of possible combinations of $m_0$ and $m_1$ may correspond to a total of 336 (=4*84) SLIDs.

EXAMPLES A1, B1, C1, AND C2

The present example describes an example of distinguishing a sidelink synchronization signal sequence from an NR downlink synchronization signal sequence by applying a different resource of a sidelink PSS or a sidelink SSS with respect to each type of a physical layer sidelink synchronization identity set (e.g., id_net and id_oon).

For example, with respect to id_net, a CS value for the sidelink SSS may be applied to be different from a CS value for a downlink SSS. Also, with respect to id_oon, a CS value for the sidelink PSS may be applied to be different from a CS value for the downlink PSS.

Sidelink PSS Resource (Example C1+C2-PSS)

A primitive polynomial and an initialization value for a sidelink PSS may be applied to be identical to those for a downlink PSS. Here, with respect to id_oon, a CS value for the sidelink PSS may be applied to be different from a CS value for the downlink PSS. Also, with respect to id_net, the CS value for the sidelink PSS may use a portion of CS values for the downlink PSS.

For example, although the same primitive polynomial and initialization value as Equation 8 may be applied to the sidelink PSS, the CS value for the sidelink PSS may be defined as CS=0 if $N_{ID}^{(2)}=0$ (i.e., in the case of id_net) and CS=43+k if $N_{ID}^{(2)}=1$ (i.e., in the case of id_oon) as represented by the following Equation 23. Here, although a value of k=21 or 22 may be given, it is provided as an example only.

$$d_{PSS}(n)=1-2x(m)$$

$$m=(n+(43+k)N_{ID}^{(2)})\bmod 127$$

$$0\le n<127 \quad \text{[Equation 23]}$$

Sidelink SSS Resource (Example C1+C2-SSS)

A primitive polynomial and an initialization value for a sidelink SSS may be applied to be identical to those for a downlink SSS. Here, with respect to id_net, a CS value for the sidelink SSS may be applied to be different from a CS value for the downlink SSS. Also, with respect to id_oon, the CS value for the sidelink SSS may use a portion of CS values for the downlink SSS.

That is, the primitive polynomial of Equation 9 may be applied to the sidelink SSS and the CS value may be applied as shown in the following examples.

For example, as shown in the following Equation 24, if $N_{ID}^{(2)}=1$ (i.e., in the case of id_oon), $m_0=\{0, 15\}$, and if $N_{ID}^{(2)}=0$ (i.e., in the case of id_net), $m_0=\{0+k, 15+k\}$. Also, $m_1=\{0, 1, \ldots, 111\}$ may be used for $m_0=\{0, 0+k\}$ and $m_1=\{0, 1, \ldots, 55\}$ may be used for $m_0=\{15, 15+k\}$. Therefore, a number of possible combinations of $m_0$ and $m_1$ may correspond to a total of 336 (=2*112+2*56) SLIDs. Here, although a value of k=45 may be given, it is provided as an example only. For example, k may be a value that satisfies 15+k<112 among multiples of 5, greater than 40 (e.g., one of k={45, 50, 55, . . . , 95}).

$$d_{SSS}(n)=[1-2x_0((n+m_0)\bmod 127)][1-2x_1((n+m_1)\bmod 127)]$$

$$m_0=15\lfloor N_{ID}^{(1)}/112\rfloor+(1-N_{ID}^{(2)})\cdot k$$

$$m_1=N_{ID}^{(1)}\bmod 112$$

$$0\le n<127 \quad \text{[Equation 24]}$$

As an additional example, as shown in the following Equation 25, if $N_{ID}^{(2)}=1$, (i.e., in the case of id_oon), $m_0=\{0, 5\}$, and if $N_{ID}^{(2)}=0$ (i.e., in the case of id_net), $m_0=\{0+k, 5+k\}$. Also, $m_1=\{0, 1, \ldots, 111\}$ may be used for $m_0=\{0, 0+k\}$, and $m_1=\{0, 1, \ldots, 55\}$ may be used for $m_0=\{5, 5+k\}$. Therefore, a number of possible combinations of $m_0$ and $m_1$ may correspond to a total of 336 (=2*112+2*56) SLIDs. Here, although a value of k=45 may be given, it is provided as an example only. For example, k may be a value that satisfies 5+k<112 among multiples of 5, greater than 40 (e.g., one of k={45, 50, 55, . . . , 105}).

$$d_{SSS}(n)=[1-2x_0((n+m_0)\bmod 127)][1-2x_1((n+m_1)\bmod 127)]$$

$$m_0=5\lfloor N_{ID}^{(1)}/112\rfloor+(1-N_{ID}^{(2)})\cdot k$$

$$m_1=N_{ID}^{(1)}\bmod 112$$

$$0\le n<127 \quad \text{[Equation 25]}$$

As an additional example, as shown in the following Equation 26, if $N_{ID}^{(2)}=1$ (i.e., in the case of id_oon), $m_0=\{0, 15\}$, and if $N_{ID}^{(2)}=0$ (i.e., in the case of id_net), $m_0=\{0+k, 15+k\}$. Also, $m_1=\{0, 1, \ldots, 83\}$ may be used for $m_0=\{0, 0+k, 15, 15+k\}$. Therefore, a number of possible combinations of $m_0$ and $m_1$ may correspond to a total of 336 (=4*84) SLIDs. Here, although a value of k=45 may be given, it is provided as an example only. For example, k may be a value that satisfies 15+k<112 among multiples of 5, greater than 40 (e.g., one of k={45, 50, 55, . . . , 95}).

$$d_{SSS}(n)=[1-2x_0((n+m_0)\bmod 127)][1-2x_1((n+m_1)\bmod 127)]$$

$$m_0=15\lfloor N_{ID}^{(1)}/84\rfloor+(1-N_{ID}^{(2)})\cdot k$$

$$m_1=N_{ID}^{(1)}\bmod 84$$

$$0\le n<127 \quad \text{[Equation 26]}$$

As an additional example, as shown in the following Equation 27, if $N_{ID}^{(2)}=1$ (i.e., in the case of id_oon), $m_0=\{0, 5\}$, and if $N_{ID}^{(2)}=0$ (i.e., in the case of id_net), $m_0=\{0+k, 5+k\}$. Also, $m_1=\{0, 1, \ldots, 83\}$ may be used for $m_0=\{0, 0+k, 5, 5+k\}$. Therefore, a number of possible combinations of $m_0$ and $m_1$ may correspond to a total of 336 (=4*84) SLIDs. Here, although a value of k=45 may be given, it is provided as an example only. For example, k may be a value that satisfies 5+k<112 among multiples of 5, greater than 40 (e.g., one of k={45, 50, 55, . . . , 105}).

$$d_{SSS}(n)=[1-2x_0((n+m_0)\bmod 127)][1-2x_1((n+m_1)\bmod 127)]$$

$$m_0=5\lfloor N_{ID}^{(1)}/84\rfloor+(1-N_{ID}^{(2)})\cdot k$$

$$m_1=N_{ID}^{(1)}\bmod 84$$

$$0\le n<127 \quad \text{[Equation 27]}$$

EXAMPLES A1 AND B2

A physical layer sidelink synchronization identity set may be defined into two types, that is, id_net and id_oon, and each of id_net and id_oon may include 336 sequences and may be defined as follows:
id_net={0, 1, . . . , 335}
id_oon={336, 337, . . . , 671}
$N_{ID}^{SL}=\{0, 1, \ldots, 671\}$
$N_{ID}^{(1)}=N_{ID}^{SL}\bmod 336$
$N_{ID}^{(2)}=\text{int}(N_{ID}^{SL}/336), N_{ID}^{(2)}=\{0, 1\}$

EXAMPLES A1, B2, AND C1

A primitive polynomial and an initialization value for a sidelink PSS may be applied to be identical to those for a downlink PSS. Here, a CS value for the sidelink PSS may be applied to be different from a CS value for the downlink PSS. The present example corresponds to example C1-PSS among the aforementioned combinations of examples A1, B1, and C1 and thus, a further description is omitted.

A primitive polynomial and an initialization value for a sidelink SSS may be applied to be identical to those for a downlink SSS. Here, a CS value for the sidelink SSS may use a portion of CS values for the downlink SSS. The present example corresponds to example C1-SSS among the aforementioned combinations of examples A1, B1, and C1 and thus, a further description is omitted. Here, examples of the present example about a CS value of the sidelink SSS are described.

For example, as shown in the above Equation 11, if a CS for a sidelink SSS is applied, $m_0=\{0, 5, 15, 20, 30, 35\}$ and $m_1=\{0, 1, \ldots, 111\}$ may be used. Therefore, a number of possible combinations of $m_0$ and $m_1$ may correspond to a total of 672 (=6*112) SLIDs.

As an additional example, as shown in the above Equation 12, if a CS for a sidelink SSS is applied, $m_0=\{0, 5, 10, 15, 20, 25\}$ and $m_1=\{0, 1, \ldots, 111\}$ may be used. Therefore, a number of possible combinations of $m_0$ and $m_1$ may correspond to a total of 672 (=6*112) SLIDs.

EXAMPLES A1, B2, AND C2

A primitive polynomial and an initialization value for a sidelink PSS may be applied to be identical to those for a downlink PSS. Here, a CS value for the sidelink PSS may use a portion of CS values for the downlink PSS. The present example corresponds to example C2-PSS among the aforementioned combinations of examples A1, B1, and C2 and thus, a further description is omitted.

A primitive polynomial and an initialization value for a sidelink SSS may be applied to be identical to those for a downlink SSS. Here, a CS value for the sidelink SSS may be applied to be different from a CS value for the downlink SSS. The present example corresponds to example C2-SSS among the aforementioned combinations of examples A1, B1, and C2 and thus, a further description is omitted. Here, examples of the present example about a CS value of the sidelink SSS are described.

For example, as shown in the above Equation 15, $m_0=\{0+k, 5+k, 15+k, 20+k, 30+k, 35+k\}$ and $m_1=\{0, 1, \ldots, 111\}$ may be used. Therefore, a number of possible combinations of $m_0$ and $m_1$ may correspond to a total of 672 (=6*112) SLIDs. Here, although a value of k=45 may be given, it is provided as an example only. For example, k may be a value that satisfies 35+k<112 among multiples of 5, greater than 40 (e.g., one of k=$\{45, 50, 55, \ldots, 75\}$).

As an additional example, as shown in the above Equation 16, $m_0=\{0+k, 5+k, 10+k, 15+k, 20+k, 25+k\}$ and $m_1=\{0, 1, \ldots, 111\}$ may be used. Therefore, a number of possible combinations of $m_0$ and $m_1$ may correspond to a total of 672 (=6*112) SLIDs. Here, although a value of k=45 may be given, it is provided as an example only. For example, k may be a value that satisfies 25+k<112 among multiples of 5, greater than 40 (e.g., one of k=$\{45, 50, 55, \ldots, 85\}$).

EXAMPLES A1, B2, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example corresponds to example C3-PSS among the aforementioned combinations of examples A1, B1, and C3 and thus, a further description is omitted.

Although a primitive polynomial and an initialization value for the sidelink SSS may use the same polynomial as that for a downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS are described.

For example, as shown in the above Equation 11, $m_0=\{0, 5, 15, 20, 30, 35\}$ and $m_1=\{0, 1, \ldots, 111\}$ may be used. Therefore, a number of possible combinations of $m_0$ and $m_1$ may correspond to a total of 672 (=6*112) SLIDs.

As an additional example, as shown in the above Equation 12, $m_0=\{0, 5, 10, 15, 20, 25\}$ and $m_1=\{0, 1, \ldots, 111\}$ may be used. Therefore, a number of possible combinations of $m_0$ and $m_1$ may correspond to a total of 672 (=6*112) SLIDs.

EXAMPLES A1, B2, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, first and second primitive polynomials used for a downlink PSS and the downlink SSS and first and second primitive polynomials used for the sidelink PSS and the sidelink SSS may not overlap.

For example, primitive polynomials used for the sidelink PSS and the sidelink SSS may be defined as primitive polynomials belonging to the same maximum connected set (see Table 6).

The present example of selecting a primitive polynomial for the sidelink PSS from the maximum connected set of Table 6 corresponds to example C4-PSS among the aforementioned combinations of examples A1, B1, and C4 and thus, a further description is omitted.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C4-SSS among the aforementioned combinations of examples A1, B1, and C4 and thus, a further description is omitted here. Here, examples of the present example about a CS value of the sidelink SSS are described.

For example, as shown in the above Equation 11, $m_0=\{0, 5, 15, 20, 30, 35\}$ and $m_1=\{0, 1, \ldots, 111\}$ may be used. Therefore, a number of possible combinations of $m_0$ and $m_1$ may correspond to a total of 672 (=6*112) SLIDs.

As an additional example, as shown in the above Equation 12, $m_0=\{0, 5, 10, 15, 20, 25\}$ and $m_1=\{0, 1, \ldots, 111\}$ may be used. Therefore, a number of possible combinations of $m_0$ and $m_1$ may correspond to a total of 672 (=6*112) SLIDs.

EXAMPLES A1, B2, C1, AND C2

The present example describes an example of distinguishing a sidelink synchronization signal sequence from an NR downlink synchronization signal sequence by applying a different resource of a sidelink PSS or a sidelink SSS with respect to each type of a physical layer sidelink synchronization identity set (e.g., id_net and id_oon).

For example, with respect to id_net, a CS value for the sidelink SSS may be applied to be different from a CS value for a downlink SSS. Also, with respect to id_oon, a CS value for the sidelink PSS may be applied to be different from a CS value for a downlink PSS.

The example of the present example of applying a CS value for the sidelink PSS to be different from a CS value for the downlink PSS with respect to id_oon and using a portion of CS values for the downlink PSS as a CS value for the sidelink PSS with respect to id_net corresponds to example C1+C2-PSS among the aforementioned combinations of examples A1, B1, C1, and C2 and thus, a further description is omitted.

Also, the example of applying a CS value for the sidelink SSS to be different from a CS value for the downlink SSS with respect to id_net and using a portion of CS values for the downlink SSS as a CS value for the sidelink SSS with respect to id_oon corresponds to example C1+C2-SSS among the aforementioned combinations of examples A1, B1, C1, and C2 and thus, a further description is omitted. Here, examples of the present example about a CS value of the sidelink SSS are described.

For example, as shown in the above Equation 24, if $N_{ID}^{(2)}=1$ (i.e., in the case of id_oon), $m_0=\{0, 15, 30\}$, and if $N_{ID}^{(2)}=0$ (i.e., in the case of id_net), $m_0=\{0+k, 15+k, 30+k\}$. Also, $m_1=\{0, 1, \ldots, 111\}$ may be used for $m_0=\{0, 0+k, 15, 15+k, 30, 30+k\}$. Therefore, a number of possible combinations of $m_0$ and $m_1$ may correspond to a total of 672 (=6*112) SLIDs. Here, although a value of k=45 may be given, it is provided as an example only. For example, k may be a value that satisfies 30+k<112 among multiples of 5, greater than 40 (e.g., one of k={45, 50, 55, ..., 80}).

As an additional example, as shown in the above Equation 25, if $N_{ID}^{(2)}=1$ (i.e., in the case of id_oon), $m_0=\{0, 5, 10\}$, and if $N_{ID}^{(2)}=0$ (i.e., in the case of id_net), $m_0=\{0+k, 5+k, 10+k\}$. Also, $m_1=\{0, 1, \ldots, 111\}$ may be used for $m_0=\{0, 0+k, 5, 5+k, 10, 10+k\}$. Therefore, a number of possible combinations of $m_0$ and $m_1$ may correspond to a total of 672 (=6*112) SLIDs. Here, although a value of k=45 may be given, it is provided as an example only. For example, k may be a value that satisfies 10+k<112 among multiples of 5, greater than 40 (e.g., one of k={45, 50, 55, ..., 100}).

EXAMPLES A1 AND B3

A physical layer sidelink synchronization identity set may be defined into two types, that is, id_net and id_oon, and each of id_net and id_oon may include 504 sequences and may be defined as follows:
id_net={0, 1, ..., 503}
id_oon={504, 505, ..., 1007}
$N_{ID}^{SL}=\{0, 1, \ldots, 1007\}$
$N_{ID}^{(1)}=N_{ID}^{SL} \bmod 504$
$N_{ID}^{(2)}=\text{int}(N_{ID}^{SL}/504)$, $N_{ID}^{(2)}=\{0, 1\}$

EXAMPLES A1, B3, AND C1

A primitive polynomial and an initialization value for a sidelink PSS may be applied to be identical to those for a downlink PSS. Here, a CS value for the sidelink PSS may be applied to be different from a CS value for the downlink PSS. The present example corresponds to example C1-PSS among the aforementioned combinations of examples A1, B1, and C1 and thus, a further description is omitted.

A primitive polynomial and an initialization value for a sidelink SSS may be applied to be identical to those for a downlink SSS. Here, a CS value for the sidelink SSS may be applied to be different from a CS value for the downlink SSS. The present example is identical to example C1-SSS among the aforementioned combinations of examples A1, B1, and C1 in terms of the primitive polynomial and the initialization value for the sidelink SSS and different therefrom in terms of examples of the CS value of the sidelink SSS. Therefore, a further description related to the corresponding description is omitted and examples of the present example about a CS value of the sidelink SSS are described.

For example, as shown in the above Equation 11, if a CS for a sidelink SSS is applied, $m_0=\{0, 5, 15, 20, 30, 35, 45, 50, 60, 65\}$ may be used. Here, $m_1=\{0, 1, \ldots, 111\}$ may be used for $m_0=\{0, 5, 15, 20, 30, 35, 45, 50\}$ and $m_1=\{0, 1, \ldots, 55\}$ may be used for $m_0=\{60, 65\}$. Therefore, a number of possible combinations of $m_0$ and $m_1$ may correspond to a total of 1008 (=8*112+2*56) SLIDs.

As an additional example, as shown in the above Equation 12, $m_0=\{0, 5, 10, 15, 20, 25, 30, 35, 40, 45\}$ may be used. Here, $m_1=\{0, 1, \ldots, 111\}$ may be used for $m_0$ and $m_1=\{0, 1, \ldots, 55\}$ may be used for $m_0=\{40, 45\}$. Therefore, a number of possible combinations of $m_0$ and $m_1$ may correspond to a total of 1008 (=8*112+2*56) SLIDs.

As an additional example, as shown in the above Equation 13, $m_0=\{0, 5, 15, 20, 30, 35, 45, 50, 60, 65, 75, 80\}$ and $m_1=\{0, 1, \ldots, 83\}$ may be used. Therefore, a number of possible combinations of $m_0$ and $m_1$ may correspond to a total of 1008 (=12*84) SLIDs.

As an additional example, as shown in the above Equation 14, $m_0=\{0, 5, 10, 15, 20, 25, 30, 35, 40, 45, 50, 55\}$ and $m_1=\{0, 1, \ldots, 83\}$ may be used. Therefore, a number of possible combinations of $m_0$ and $m_1$ may correspond to a total of 1008 (=12*84) SLIDs.

EXAMPLES A1, B3, AND C2

A primitive polynomial and an initialization value for a sidelink PSS may be applied to be identical to those for a downlink PSS. Here, a CS value for the sidelink PSS may use a portion of CS values for the downlink PSS. The present example corresponds to example C2-PSS among the aforementioned combinations of examples A1, B1, and C2 and thus, a further description is omitted here.

A primitive polynomial and an initialization value for a sidelink SSS may be applied to be identical to those for a downlink SSS. Here, a CS value for the sidelink SSS may be applied to be different from a CS value for the downlink SSS. The present example corresponds to example C2-SSS among the aforementioned combinations of examples A1, B1, and C2 and thus, a further description is omitted. Here, examples of the present example about a CS value of the sidelink SSS are described.

For example, as shown in the above Equation 15, $m_0=\{0+k, 5+k, 15+k, 20+k, 30+k, 35+k, 45+k, 50+k, 60+k, 65+k\}$ may be used. Here, $m_1=\{0, 1, \ldots, 111\}$ may be used for $m_0=\{0+k, 5+k, 15+k, 20+k, 30+k, 35+k, 45+k, 50+k\}$ and $m_1=\{0, 1, \ldots, 55\}$ may be used for $m_0=\{60+k, 65+k\}$. Therefore, a number of possible combinations of $m_0$ and $m_1$ may correspond to a total of 1008 (=8*112+2*56) SLIDs. Here, k=45 may be given. For example, k may be a value that satisfies 65+k<112 among multiples of 5, greater than 40.

As an additional example, as shown in the above Equation 16, $m_0=\{0+k, 5+k, 10+k, 15+k, 20+k, 25+k, 30+k, 35+k, 40+k, 45+k\}$ may be used. Here, $m_1=\{0, 1, \ldots, 111\}$ may be used for $m_0=\{0+k, 5+k, 10+k, 15+k, 20+k, 25+k, 30+k, 35+k\}$, and $m_1=\{0, 1, \ldots, 55\}$ may be used for $m_0=\{40+k, 45+k\}$. Therefore, a number of possible combinations of $m_0$ and $m_1$ may correspond to a total of 1008 (=8*112+2*56) SLIDs. Here, although a value of k=45 may be given, it is provided as an example only. For example, k may be a value that satisfies 45+k <112 among multiples of 5, greater than 40 (e.g., one of k={45, 50, 55, 60, 65}).

As an additional example, as shown in the above Equation 18, $m_0=\{0+k, 5+k, 10+k, 15+k, 20+k, 25+k, 30+k, 35+k, 40+k, 45+k, 50+k, 55+k\}$ and $m_1=\{0, 1, \ldots, 83\}$ may be used. Therefore, a number of possible combinations of $m_0$ and $m_1$ may correspond to a total of 1008 (=8*112+2*56) SLIDs. Here, although a value of k=45 may be given, it is provided as an example only. For example, k may be a value that satisfies 55+k<112 among multiples of 5, greater than 40 (e.g., one of k={45, 50, 55}).

EXAMPLES A1, B3, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example corresponds to example C3-PSS among the aforementioned combinations of examples A1, B1, and C3 and thus, a further description is omitted.

Although a primitive polynomial and an initialization value for the sidelink SSS may use the same polynomial as that for a downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS are described.

For example, as shown in the above Equation 11, $m_0$={0, 5, 15, 20, 30, 35, 45, 50, 60, 65} may be used. Here, $m_1$={0, 1, . . . , 111} may be used for $m_0$={0, 5, 15, 20, 30, 35, 45, 50} and $m_1$={0, 1, . . . , 55} may be used for $m_0$={60, 65}. Therefore, a number of possible combinations of $m_0$ and $m_1$ may correspond to a total of 1008 (=8*112+2*56) SLIDs.

As an additional example, as shown in the above Equation 12, $m_0$={0, 5, 10, 15, 20, 25, 30, 35, 40, 45} may be used. Here, $m_1$={0, 1, . . . , 111} may be used for $m_0$={0, 5, 10, 15, 20, 25, 30, 35} and $m_1$={0, 1, . . . , 55} may be used for $m_0$={40, 45}. Therefore, a number of possible combinations of $m_0$ and $m_1$ may correspond to a total of 1008 (=8*112+2*56) SLIDs.

As an additional example, as shown in the above Equation 13, $m_0$={0, 10, 15, 20, 30, 35, 45, 50, 60, 65, 75, 80} and $m_1$={0, 1, . . . , 83} may be used. Therefore, a number of possible combinations of $m_0$ and $m_1$ may correspond to a total of 1008 (=12*84) SLIDs.

As an additional example, as shown in the above Equation 14, $m_0$={0, 5, 10, 15, 20, 25, 30, 35, 40, 45, 50, 55} and $m_1$={0, 1, . . . , 83} may be used. Therefore, a number of possible combinations of $m_0$ and $m_1$ may correspond to a total of 1008 (=12*84) SLIDs.

EXAMPLES A1, B3, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, first and second primitive polynomials used for a downlink PSS and the downlink SSS and first and second primitive polynomials used for the sidelink PSS and the sidelink SSS may not overlap.

For example, primitive polynomials used for the sidelink PSS and the sidelink SSS may be defined as primitive polynomials belonging to the same maximum connected set (see Table 6).

The present example of selecting one of polynomials belonging to the maximum connected set of Table 6 as a primitive polynomial for the sidelink PSS corresponds to example C4-PSS among the aforementioned combinations of examples A1, B1, and C4 and thus, a further description is omitted.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C4-SSS among the aforementioned combinations of examples A1, B1, and C4 and thus, a further description is omitted. Here, examples of the present example about a CS value of the sidelink SSS are described.

For example, as shown in the above Equation 11, $m_0$={0, 5, 15, 20, 30, 35, 45, 50, 60, 65} may be used. Here, $m_1$={0, 1, . . . , 111} may be used for $m_0$={0, 5, 15, 20, 30, 35, 45, 50} and $m_1$={0, 1, . . . , 55} may be used for m0={60, 65}. Therefore, a number of possible combinations of $m_0$ and $m_1$ may correspond to a total of 1008 (=8*112+2*56) SLIDs.

As an additional example, as shown in the above Equation 12, $m_0$={0, 5, 10, 15, 20, 25, 30, 35, 40, 45} may be used. Here, $m_1$={0, 1, . . . , 111} may be used for $m_0$={0, 5, 10, 15, 20, 25, 30, 35}, and $m_1$={0, 1, . . . , 55} may be used for $m_0$={40, 45}. Therefore, a number of possible combinations of $m_0$ and $m_1$ may correspond to a total of 1008 (=8*112+2*56) SLIDs.

As an additional example, as shown in the above Equation 13, $m_0$={0, 10, 15, 20, 30, 35, 45, 50, 60, 65, 75, 80} and $m_1$={0, 1, . . . , 83} may be used. Therefore, a number of possible combinations of $m_0$ and $m_1$ may correspond to a total of 1008 (=12*84) SLIDs.

As an additional example, as shown in the above Equation 14, $m_0$={0, 5, 10, 15, 20, 25, 30, 35, 40, 45, 50, 55} and $m_1$={0, 1, . . . , 83} may be used. Therefore, a number of possible combinations of $m_0$ and $m_1$ may correspond to a total of 1008 (=12*84) SLIDs.

EXAMPLES A1, B3, C1, AND C2

The present example describes an example of distinguishing a sidelink synchronization signal sequence from an NR downlink synchronization signal sequence by applying a different resource of a sidelink PSS or a sidelink SSS with respect to each type of a physical layer sidelink synchronization identity set (e.g., id_net and id_oon).

For example, with respect to id_net, a CS value for the sidelink SSS may be applied to be different from a CS value for a downlink SSS. Also, with respect to id_oon, a CS value for the sidelink PSS may be applied to be different from a CS value for a downlink PSS.

The example of the present example of applying a CS value for the sidelink PSS to be different from a CS value for the downlink PSS with respect to id_oon and using a portion of CS values for the downlink PSS as a CS value for the sidelink PSS with respect to id_net corresponds to example C1+C2-PSS among the aforementioned combinations of examples A1, B1, C1, and C2 and thus, a further description is omitted.

Also, the example of applying a CS value for the sidelink SSS to be different from a CS value for the downlink SSS with respect to id_net and using a portion of CS values for the downlink SSS as a CS value for the sidelink SSS with respect to id_oon corresponds to example C1+C2-SSS among the aforementioned combinations of examples A1, B1, C1, and C2 and thus, a further description is omitted. Here, examples of the present example about a CS value of the sidelink SSS are described.

For example, as shown in the above Equation 24, if $N_{ID}^{(2)}=1$ (i.e., in the case of id_oon), $m_0=\{0, 15, 30, 45, 60\}$, and if $N_{ID}^{(2)}=0$ (i.e., in the case of id_net), $m_0=\{0+k, 15+k, 30+k, 45+k, 60+k\}$. Also, $m_1=\{0, 1, \ldots, 111\}$ may be used for $m_0=\{0, 0+k, 15, 15+k, 30, 30+k, 45, 45+k\}$ and $m_1=\{0, 1, \ldots, 55\}$ may be used for $m_0=\{60, 60+k\}$. Therefore, a number of possible combinations of $m_0$ and $m_1$ may correspond to a total of 1008 (=8*112+2*56) SLIDs. Here, although a value of k=45 may be given, it is provided as an example only. For example, k may be a value that satisfies 60+k<112 among multiples of 5, greater than 40 (e.g., one of k={45, 50}).

As an additional example, as shown in the above Equation 25, if $N_{ID}^{(2)}=1$ (i.e., in the case of id_oon), $m_0=\{0, 5, 10, 15, 20\}$, and if $N_{ID}^{(2)}=0$ (i.e., in the case of id_net), $m_0=\{0+k, 5+k, 10+k, 15+k, 20+k\}$. Also, $m_1=\{0, 1, \ldots, 111\}$ may be used for $m_0=\{0, 0+k, 5, 5+k, 10, 10+k, 15, 15+k\}$, and $m_1=\{0, 1, \ldots, 55\}$ may be used for $m_0=\{20, 20+k\}$. Therefore, a number of possible combinations of $m_0$ and $m_1$ may correspond to a total of 1008 (=8*112+2*56) SLIDs. Here, although a value of k=45 may be given, it is provided as an example only. For example, k may be a value that satisfies 20+k<112 among multiples of 5, greater than 40 (e.g., one of k={45, 50, 55, \ldots, 90}).

As an additional example, as shown in the above Equation 27, if $N_{ID}^{(2)}=1$ (i.e., in the case of id_oon), $m_0=\{0, 5, 10, 15, 20, 25\}$, and if $N_{ID}^{(2)}=0$ (i.e., in the case of id_net), $m_0=\{0+k, 5+k, 10+k, 15+k, 20+k, 25+k\}$. Here, $m_1=\{0, 1, \ldots, 83\}$ may be used for $m_0=\{0, 0+k, 5, 5+k, 10, 10+k, 15, 15+k, 20, 20+k, 25, 25+k\}$. Therefore, a number of possible combinations of $m_0$ and $m_1$ may correspond to a total of 1008 (=12*84) SLIDs. Here, although a value of k=45 may be given, it is provided as an example only. For example, k may be a value that satisfies 25+k<112 among multiples of 5, greater than 40 (e.g., one of k={45, 50, 55, \ldots, 85}).

EXAMPLES A1 AND B4

A physical layer sidelink synchronization identity set may be defined into two types, that is, id_net and id_oon, and each of id_net and id_oon may include 1008 sequences and may be defined as follows:
id_net={0, 1, \ldots, 1007}
id_oon={1008, 1009, \ldots, 2015}
$N_{ID}^{SL}=\{0, 1, \ldots, 2015\}$
$N_{ID}^{(1)}=N_{ID}^{SL} \bmod 1008$
$N_{ID}^{(2)}=int(N_{ID}^{SL}/1008)$, $N_{ID}^{(2)}=\{0, 1\}$

EXAMPLES A1, B4, AND C1

A primitive polynomial and an initialization value for a sidelink PSS may be applied to be identical to those for a downlink PSS. Here, a CS value for the sidelink PSS may be applied to be different from a CS value for the downlink PSS. The present example corresponds to example C1-PSS among the aforementioned combinations of examples A1, B1, and C1 and thus, a further description is omitted.

A primitive polynomial and an initialization value for a sidelink SSS may be applied to be identical to those for a downlink SSS. Here, a CS value for the sidelink SSS may be applied to be different from a CS value for the downlink SSS. The present example is identical to example C1-SSS among the aforementioned combinations of examples A1, B1, and C1 in terms of the primitive polynomial and the initialization value for the sidelink SSS and different therefrom in terms of examples of the CS value of the sidelink SSS. Therefore, a further description related to the corresponding description is omitted and examples of the present example about a CS value of the sidelink SSS are described.

For example, as shown in the above Equation 12, $m_0=\{0, 5, 10, 15, 20, 25, 30, 35, 40, 45, 50, 55, 60, 65, 70, 75, 80, 85\}$ and $m_1=\{0, 1, \ldots, 111\}$ may be used. Therefore, a number of possible combinations of $m_0$ and $m_1$ may correspond to a total of 2016 (=18*112) SLIDs.

EXAMPLES A1, B4, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example corresponds to example C3-PSS among the aforementioned combinations of examples A1, B1, and C3 and thus, a further description is omitted.

Although a primitive polynomial and an initialization value for the sidelink SSS may use the same polynomial as that for a downlink SSS, first and second primitive polynomial may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS are described.

For example, as shown in the above Equation 12, $m_0=\{0, 5, 10, 15, 20, 25, 30, 35, 40, 45, 50, 55, 60, 65, 70, 75, 80, 85\}$ and $m_1=\{0, 1, \ldots, 111\}$ may be used. Therefore, a number of possible combinations of $m_0$ and $m_1$ may correspond to a total of 2016 (=18*112) SLIDs.

EXAMPLES A1, B4, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, first and second primitive polynomials used for a downlink PSS and the downlink SSS and first and second primitive polynomials used for the sidelink PSS and the sidelink SSS may not overlap.

For example, primitive polynomials used for the sidelink PSS and the sidelink SSS may be defined as primitive polynomials belonging to the same maximum connected set (see Table 6).

The present example of selecting one of polynomials belonging to the maximum connected set of Table 6 as a primitive polynomial for the sidelink PSS corresponds to example C4-PSS among the aforementioned combinations of examples A1, B1, and C4 and thus, a further description is omitted.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C1-SSS among the aforementioned combinations of examples A1, B1, and C1 and thus, a further description is omitted. Here, examples of the present example about a CS value of the sidelink SSS are described.

For example, as shown in the above Equation 12, $m_0=\{0, 5, 10, 15, 20, 25, 30, 35, 40, 45, 50, 55, 60, 65, 70, 75, 80, 85\}$ and $m_1=\{0, 1, \ldots, 111\}$ may be used. Therefore, a number of possible combinations of $m_0$ and $m_1$ may correspond to a total of 2016 (=18*112) SLIDs.

EXAMPLES A1, B4, C1, AND C2

The present example describes an example of distinguishing a sidelink synchronization signal sequence from an NR downlink synchronization signal sequence using a different resource of a sidelink PSS or a sidelink SSS with respect to each type of a physical layer sidelink synchronization identity set (e.g., id_net and id_oon).

For example, with respect to id_net, a CS value for the sidelink SSS may be applied to be different from a CS value for a downlink SSS. Also, with respect to id_oon, a CS value for the sidelink PSS may be applied to be different from a CS value for a downlink PSS.

The example of the present example of applying a CS value for the sidelink PSS to be different from a CS value for the downlink PSS with respect to id_oon and using a portion of CS values for the downlink PSS as a CS value for the sidelink PSS with respect to id_net corresponds to example C1+C2-PSS among the aforementioned combinations of examples A1, B1, C1, and C2 and thus, a further description is omitted.

Also, the example of applying a CS value for the sidelink SSS to be different from a CS value for the downlink SSS with respect to id_net and using a portion of CS values for the downlink SSS as a CS value for the sidelink SSS with respect to id_oon corresponds to example C1+C2-SSS among the aforementioned combinations of examples A1, B1, C1, and C2 and thus, a further description is omitted. Here, examples of the present example about a CS value of the sidelink SSS are described.

For example, as shown in the above Equation 25, if $N_{ID}^{(2)}=1$ (i.e., in the case of id_oon), $m_0=\{0, 5, 10, 15, 20, 25, 30, 35, 40\}$, and if $N_{ID}^{(2)}=0$ (i.e., in the case of id_net), $m_0=\{0+k, 5+k, 10+k, 15+k, 20+k, 25+k, 30+k, 35+k, 40+k\}$. Also, $m_1=\{0, 1, \ldots, 111\}$ may be used for $m_0=\{0, 0+k, 5, 5+k, 10, 10+k, 15, 15+k, 20, 20+k, 25, 25+k, 30, 30+k, 35, 35+k, 40, 40+k\}$. Therefore, a number of possible combinations of $m_0$ and $m_1$ may correspond to a total of 2016 (=18*112) SLIDs. Here, although a value of k=45 may be given, it is provided as an example only. For example, k may be a value that satisfies 40+k<112 among multiples of 5, greater than 40 (e.g., one of k=\{45, 50, 55, \ldots, 70\}).

EXAMPLES A2 AND B1

A physical layer sidelink synchronization identity set may be defined into three types, that is, id_net_1, id_net_2, and id_oon, and each of id_net_1, id_net_2, and id_oon may include 168 sequences and may be defined as follows:

id_net_1=\{0, 1, \ldots, 167\}
id_net_2=\{168, 169, \ldots, 335\}
id_oon=\{336, 337, \ldots, 503\}
$N_{ID}^{SL}=\{0, 1, \ldots, 503\}$
$N_{ID}^{(1)}=N_{ID}^{SL} \bmod 168$
$N_{ID}^{(2)}=\text{int}(N_{ID}^{SL}/168)$, $N_{ID}^{(2)}=\{0, 1, 2\}$

EXAMPLES A2, B1, AND C1

A primitive polynomial and an initialization value for a sidelink PSS may be applied to be identical to those for a downlink PSS. Here, a CS value for the sidelink PSS may be applied to be different from a CS value for the downlink PSS. The present example corresponds to example C1-PSS among the aforementioned combinations of examples A1, B1, and C1 and thus, a further description is omitted.

As shown in the above Equation 10, the CS value for the sidelink PSS may be defined as CS=0+k if $N_{ID}^{(2)}=0$, CS=43+k if $N_{ID}^{(2)}=1$, and CS=86+k if $N_{ID}^{(2)}=2$. Here, although a value of k=21 or 22 may be given, it is provided as an example only.

A primitive polynomial and an initialization value for a sidelink SSS may be applied to be identical to those for a downlink SSS. Here, a CS value for the sidelink SSS may use a portion of CS values for the downlink SSS. The present example corresponds to example C1-SSS among the aforementioned combinations of examples A1, B1, and C1 and thus, a further description is omitted. Here, examples of the present example about a CS value of the sidelink SSS are described.

For example, as shown in the above Equation 11, $m_0=\{0, 5, 10, 15, 20, 25\}$ may be used. Here, $m_1=\{0, 1, \ldots, 111\}$ may be used for $m_0=\{0, 5, 10\}$ and $m_1=\{0, 1, \ldots, 55\}$ may be used for $m_0=\{15, 20, 25\}$. Therefore, a number of possible combinations of $m_0$ and $m_1$ may correspond to a total of 504 (=3*112+3*56) SLIDs.

As an additional example, as shown in the above Equation 13, $m_0=\{0, 5, 10, 15, 20, 25\}$ and $m_1=\{0, 1, \ldots, 83\}$ may be used. Therefore, a number of possible combinations of $m_0$ and $m_1$ may correspond to a total of 504 (=6*84) SLIDs.

EXAMPLES A2, B1, AND C2

A primitive polynomial and an initialization value for a sidelink PSS may be applied to be identical to those for a downlink PSS. Here, a CS value for the sidelink PSS may be applied to be identical to a CS value for the downlink PSS. That is, the CS value may be defined as CS=0 if $N_{ID}^{(2)}=0$, CS=43 if $N_{ID}^{(2)}=1$, and CS=86 if $N_{ID}^{(2)}=2$.

A primitive polynomial and an initialization value for a sidelink SSS may be applied to be identical to those for a downlink SSS. Here, a CS value for the sidelink SSS may be applied to be different from a CS value for the downlink SSS. The present example corresponds to example C2-SSS among the aforementioned combinations of examples A1, B1, and C2 and thus, a further description is omitted. Here, examples of the present example about a CS value of the sidelink SSS are described.

For example, as shown in the above Equation 15, $m_0=\{0+k, 5+k, 10+k, 15+k, 20+k, 25+k\}$ may be used. Here, $m_1=\{0, 1, \ldots, 111\}$ may be used for $m_0=\{0+k, 5+k, 10+k\}$ and $m_1=\{0, 1, \ldots, 55\}$ may be used for $m_0=\{15+k, 20+k, 25+k\}$. Therefore, a number of possible combinations of $m_0$ and $m_1$ may correspond to a total of 504 (=3*112+3*56) SLIDs. Here, although a value of k=45 may be given, it is provided as an example only. For example, k may be a value that satisfies 25+k<112 among multiples of 5, greater than 40 (e.g., one of k=\{45, 50, 55, \ldots, 85\}).

As an additional example, as shown in the above Equation 17, $m_0=\{0+k, 5+k, 10+k, 15+k, 20+k, 25+k\}$ and $m_1=\{0, 1, \ldots, 83\}$ may be used. Therefore, a number of possible combinations of $m_0$ and $m_1$ may correspond to a total of 504 (=3*112+3*56) SLIDs. Here, although a value of k=45 may be given, it is provided as an example only. For example, k may be a value that satisfies 25+k<112 among multiples of 5, greater than 40 (e.g., one of k={45, 50, 55, ..., 85}).

EXAMPLES A2, B1, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example is identical to description related to a sidelink PSS primitive polynomial and initialization value in example C3-PSS among the aforementioned combinations of examples A1, B1, and C3 and thus, a further description is omitted.

A CS value for the sidelink PSS may be defined as CS=0 if $N_{ID}^{(2)}$=0, CS=43 if $N_{ID}^{(2)}$=1, and CS=86 if $N_{ID}^{(2)}$=2.

Although a primitive polynomial and an initialization value for the sidelink SSS use the same polynomial to that for the downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS will be described.

For example, as shown in the above Equation 11, $m_0$={0, 5, 10, 15, 20, 25} may be used. Here, $m_1$={0, 1, ..., 111} may be used for $m_0$={0, 5, 10} and $m_1$={0, 1, ..., 55} may be used for $m_0$={15, 20, 25}. Therefore, a number of possible combinations of $m_0$ and $m_1$ may correspond to a total of 504 (=3*112+3*56) SLIDs.

As an additional example, as shown in the above Equation 13, $m_0$={0, 5, 10, 15, 20, 25} and $m_1$={0, 1, ..., 83} may be used. Therefore, a number of possible combinations of $m_0$ and $m_1$ may correspond to a total of 504 (=6*84) SLIDs.

EXAMPLES A2, B1, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, the first and second primitive polynomials used for the downlink PSS and the downlink SSS and first and second primitive polynomials used for the sidelink PSS and the sidelink SSS may not overlap.

A primitive polynomial for the sidelink PSS may be selected from among polynomials belonging to the maximum connected set of Table 6. The present example is identical to description related to a sidelink PSS primitive polynomial and initialization value in example C4-PSS among the aforementioned combinations of examples A1, B1, and C4 and thus, a further description is omitted.

A CS value for the sidelink PSS may be defined as CS=0 if $N_{ID}^{(2)}$=0, CS=43 if $N_{ID}^{(2)}$=1, and CS=86 if $N_{ID}^{(2)}$=2.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C4-SSS among the aforementioned combinations of examples A1, B1, and C4 and thus, a further description is omitted here. Here, examples of the present example about a CS value of the sidelink SSS are described.

For example, as shown in the above Equation 11, $m_0$={0, 5, 10, 15, 20, 25} may be used. Here, $m_1$={0, 1, ..., 111} may be used for $m_0$={0, 5, 10}, and $m_1$={0, 1, ..., 55} may be used for $m_0$={15, 20, 25}. Therefore, a number of possible combinations of $m_0$ and $m_1$ may correspond to a total of 504 (=3*112+3*56) SLIDs.

As an additional example, as shown in the above Equation 13, $m_0$={0, 5, 10, 15, 20, 25} and $m_1$={0, 1, ..., 83} may be used. Therefore, a number of possible combinations of $m_0$ and $m_1$ may correspond to a total of 540 (=6*84) SLIDs.

EXAMPLES A2 AND B2

A physical layer sidelink synchronization identity set may be defined into three types, that is, id_net_1, id_net_2, and id_oon, and each of id_net_1, id_net_2, and id_oon may include 336 sequences and may be defined as follows:
id_net_1={0, 1, ..., 335}
id_net_2={336, 337, ..., 503}
id_oon={504, 505, ..., 1007}
$N_{ID}^{SL}$={0, 1, ..., 1007}
$N_{ID}^{(1)}$=$N_{ID}^{SL}$ mod 336
$N_{ID}^{(2)}$=int($N_{ID}^{SL}$/336), $N_{ID}^{(2)}$={0, 1, 2}

EXAMPLES A2, B2, AND C1

A primitive polynomial and an initialization value for a sidelink PSS may be applied to be identical to those for a downlink PSS. Here, a CS value for the sidelink PSS may be applied to be different from a CS value for the downlink PSS. The present example is identical to description related to a sidelink PSS primitive polynomial and initialization value in example C1-PSS among the aforementioned combinations of examples A1, B1, and C1 and thus, a further description is omitted.

As shown in the above Equation 10, the CS value for the sidelink PSS may be defined as CS=0+k if $N_{ID}^{(2)}$=0, CS=43+k if $N_{ID}^{(2)}$=1, and CS=86+k if $N_{ID}^{(2)}$=2. Here, although a value of k=21 or 22 may be given, it is provided as an example only.

A primitive polynomial and an initialization value for a sidelink SSS may be applied to be identical to those for a downlink SSS. Here, a CS value for the sidelink SSS may be applied to be identical to a CS value for the downlink SSS.

For example, as shown in the above Equation 11, $m_0$={0, 5, 10, 15, 20, 25, 30, 35, 40} and $m_1$={0, 1, ..., 111} may be used. Therefore, a number of possible combinations of $m_0$ and $m_1$ may correspond to a total of 1008 (=9*112) SLIDs.

EXAMPLES A2, B2, AND C2

A primitive polynomial and an initialization value for a sidelink PSS may be applied to be identical to those for a downlink PSS. Here, a CS value for the sidelink PSS may be applied to be identical to a CS value for the downlink PSS.

That is, the CS value may be defined as CS=0 if $N_{ID}^{(2)}=0$, CS=43 if $N_{ID}^{(2)}=1$, and CS=86 if $N_{ID}^{(2)}=2$.

A primitive polynomial and an initialization value for a sidelink SSS may be applied to be identical to those for a downlink SSS. Here, a CS value for the sidelink SSS may be applied to be different from a CS value for the downlink SSS. The present example corresponds to example C2-SSS among the aforementioned combinations of examples A1, B1, and C2 and thus, a further description is omitted. Here, examples of the present example about a CS value of the sidelink SSS are described.

For example, as shown in the above Equation 15, $m_0=\{0+k, 5+k, 10+k, 15+k, 20+k, 25+k, 30+k, 35+k, 40+k\}$ and $m_1=\{0, 1, \ldots, 111\}$ may be used. Therefore, a number of possible combinations of $m_0$ and $m_1$ may correspond to a total of 1008 (=9*112) SLIDs. Here, although a value of k=45 may be given, it is provided as an example only. For example, k may be a value that satisfies 40+k<112 among multiples of 5, greater than 40 (e.g., one of k={45, 50, 55, ..., 70}).

EXAMPLES A2, B2, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example is identical to description related to a sidelink PSS primitive polynomial and initialization value in example C3-PSS among the aforementioned combinations of examples A1, B1, and C3 and thus, a further description is omitted.

A CS value for the sidelink PSS may be defined as CS=0 if $N_{ID}^{(2)}=0$, CS=43 if $N_{ID}^{(2)}=1$, and CS=86 if $N_{ID}^{(2)}=2$.

Although a primitive polynomial and an initialization value for the sidelink SSS may use the same polynomial as that for a downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS are described.

For example, as shown in the above Equation 11, $m_0=\{0, 5, 10, 15, 20, 25, 30, 35, 40\}$ and $m_1=\{0, 1, \ldots, 111\}$ may be used. Therefore, a number of possible combinations of $m_0$ and $m_1$ may correspond to a total of 1008 (=9*112) SLIDs.

EXAMPLES A2, B2, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, first and second primitive polynomials used for a downlink PSS and the downlink SSS and first and second primitive polynomials used for the sidelink PSS and the sidelink SSS may not overlap.

A primitive polynomial for the sidelink PSS may be selected from among polynomials belonging to the maximum connected set of Table 6. The present example is identical to description related to a sidelink PSS primitive polynomial and initialization value in example C4-PSS among the aforementioned combinations of examples A1, B1, and C4 and thus, a further description is omitted.

A CS value for the sidelink PSS may be defined as CS=0 if $N_{ID}^{(2)}=0$, CS=43 if $N_{ID}^{(2)}=1$, and CS=86 if $N_{ID}^{(2)}=2$.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C4-SSS among the aforementioned combinations of examples A1, B1, and C4 and thus, a further description is omitted here. Here, examples of the present example about a CS value of the sidelink SSS are described.

For example, as shown in the above Equation 11, $m_0=\{0, 5, 10, 15, 20, 25, 30, 35, 40\}$ and $m_1=\{0, 1, \ldots, 111\}$ may be used. Therefore, a number of possible combinations of $m_0$ and $m_1$ may correspond to a total of 1008 (=9*112) SLIDs.

EXAMPLES A2 AND B3

A physical layer sidelink synchronization identity set may be defined into three types, that is, id_net_1, id_net_2, and id_oon, and each of id_net_1, id_net_2, and id_oon may include 504 sequences and may be defined as follows:
id_net_1={0, 1, ..., 503}
id_net_2={504, 505, ..., 1007}
id_oon={1008, 1009, ..., 1511}
$N_{ID}^{SL}=\{0, 1, \ldots, 1512\}$
$N_{ID}^{(1)}=N_{ID}^{SL} \bmod 504$
$N_{ID}^{(2)}=\text{int}(N_{ID}^{SL}/504)$, $N_{ID}^{(2)}=\{0, 1, 2\}$

EXAMPLES A2, B3, AND C1

A primitive polynomial and an initialization value for a sidelink PSS may be applied to be identical to those for a downlink PSS. Here, a CS value for the sidelink PSS may be applied to be different from a CS value for the downlink PSS. The present example is identical to description related to a sidelink PSS primitive polynomial and initialization value in example C1-PSS among the aforementioned combinations of examples A1, B1, and C1 and thus, a further description is omitted.

As shown in the above Equation 10, the CS value for the sidelink PSS may be defined as CS=0+k if $N_{ID}^{(2)}=0$, CS=43+k if $N_{ID}^{(2)}=1$, and CS=86+k if $N_{ID}^{(2)}=2$. Here, although a value of k=21 or 22 may be given, it is provided as an example only.

A primitive polynomial and an initialization value for a sidelink SSS may be applied to be identical to those for a downlink SSS. Here, a CS value for the sidelink SSS may be applied to be identical to a CS value for the downlink SSS.

For example, as shown in the above Equation 11, $m_0=\{0, 5, 10, 15, 20, 25, 30, 35, 40, 45, 50, 55, 60, 65, 70\}$ may be used. Here, $m_1=\{0, 1, \ldots, 111\}$ may be used for $m_0=\{0, 5, 10, 15, 20, 25, 30, 35, 40, 45, 50, 55\}$ and $m_1=\{0, 1, \ldots, 55\}$ may be used for $m_0=\{60, 65, 70\}$. Therefore, a number of possible combinations of $m_0$ and $m_1$ may correspond to a total of 1512 (=12*112+3*56) SLIDs.

As an additional example, as shown in the above Equation 13, $m_0=\{0, 5, 10, 15, 20, 25, 30, 35, 40, 45, 50, 55, 60, 65, 70, 75, 80, 85\}$ and $m_1=\{0, 1, \ldots, 83\}$ may be used.

Therefore, a number of possible combinations of $m_0$ and $m_1$ may correspond to a total of 1512 (=18*84) SLIDs.

EXAMPLES A2, B3, AND C3

A primitive polynomial for a sidelink PSS may use another single primitive polynomial (e.g., a polynomial corresponding to octal 203 of Table 5) distinguished from a primitive polynomial applied to a downlink PSS among first and second primitive polynomials for a sidelink SSS. The present example is identical to description related to a sidelink PSS primitive polynomial and initialization value in example C3-PSS among the aforementioned combinations of examples A1, B1, and C3 and thus, a further description is omitted.

A CS value for the sidelink PSS may be defined as CS=0 if $N_{ID}^{(2)}=0$, CS=43 if $N_{ID}^{(2)}=1$, and CS=86 if $N_{ID}^{(2)}=2$.

Although a primitive polynomial and an initialization value for the sidelink SSS may use the same polynomial as that for a downlink SSS, first and second primitive polynomials may be replaced with each other. For example, if first and second primitive polynomials applied to the downlink SSS are defined as polynomials corresponding to octal 221 and 203 of Table 5, respectively (see Equation 9), first and second primitive polynomials applied to the sidelink SSS may be defined as polynomials corresponding to octal 203 and 221 of Table 5, respectively. The present example corresponds to example C3-SSS among the aforementioned combinations of examples A1, B1, and C3 and thus, a further description is omitted. Here, examples of the present example about a CS value of the sidelink SSS will be described.

For example, as shown in the above Equation 11, $m_0=\{0, 5, 10, 15, 20, 25, 30, 35, 40, 45, 50, 55, 60, 65, 70\}$ may be used. Here, $m_1=\{0, 1, \ldots, 111\}$ may be used for $m_0=\{0, 5, 10, 15, 20, 25, 30, 35, 40, 45, 50, 55\}$ and $m_1=\{0, 1, \ldots, 55\}$ may be used for $m_0=\{60, 65, 70\}$. Therefore, a number of possible combinations of $m_0$ and $m_1$ may correspond to a total of 1512 (=12*112+3*56) SLIDs.

As an additional example, as shown in the above Equation 13, $m_0=\{0, 5, 10, 15, 20, 25, 30, 35, 40, 45, 50, 55, 60, 65, 70, 75, 80, 85\}$ and $m_1=\{0, 1, \ldots, 83\}$ may be used. Therefore, a number of possible combinations of $m_0$ and $m_1$ may correspond to a total of 1512 (=18*84) SLIDs.

EXAMPLES A2, B3, AND C4

In the present example, first and second primitive polynomials different from those applied to a downlink SSS may be applied to a sidelink SSS. Also, one of the first and second primitive polynomials for the sidelink SSS may be applied as a primitive polynomial for a sidelink PSS. Therefore, first and second primitive polynomials used for a downlink PSS and the downlink SSS and first and second primitive polynomials used for the sidelink PSS and the sidelink SSS may not overlap.

A primitive polynomial for the sidelink PSS may be selected from among polynomials belonging to the maximum connected set of Table 6. The present example is identical to description related to a sidelink PSS primitive polynomial and initialization value in example C4-PSS among the aforementioned combinations of examples A1, B1, and C4 and thus, a further description is omitted.

A CS value for the sidelink PSS may be defined as CS=0 if $N_{ID}^{(2)}=0$, CS=43 if $N_{ID}^{(2)}=1$, and CS=86 if $N_{ID}^{(2)}=2$.

The same primitive polynomial as a primitive polynomial for a sidelink PSS may be selected as a first primitive polynomial for the sidelink SSS, and one of polynomials belonging to the same maximum connected set as that of the first primitive polynomial may be selected as a second primitive polynomial for the sidelink SSS. The present example corresponds to example C4-SSS among the aforementioned combinations of examples A1, B1, and C4 and thus, a further description is omitted here. Here, examples of the present example about a CS value of the sidelink SSS are described.

For example, as shown in the above Equation 11, $m_0=\{0, 5, 10, 15, 20, 25, 30, 35, 40, 45, 50, 55, 60, 65, 70\}$ may be used. Here, $m_1=\{0, 1, \ldots, 111\}$ may be used for $m_0=\{0, 5, 10, 15, 20, 25, 30, 35, 40, 45, 50, 55\}$ and $m_1=\{0, 1, \ldots, 55\}$ may be used for $m_0=\{60, 65, 70\}$. Therefore, a number of possible combinations of $m_0$ and $m_1$ may correspond to a total of 1512 (=12*112+3*56) SLIDs.

As an additional example, as shown in Equation 13, $m_0=\{0, 5, 10, 15, 20, 25, 30, 35, 40, 45, 50, 55, 60, 65, 70, 75, 80, 85\}$ and $m_1=\{0, 1, \ldots, 83\}$ may be used. Therefore, a number of possible combinations of $m_0$ and $m_1$ may correspond to a total of 1512 (=18*84) SLIDs.

Figure 12:
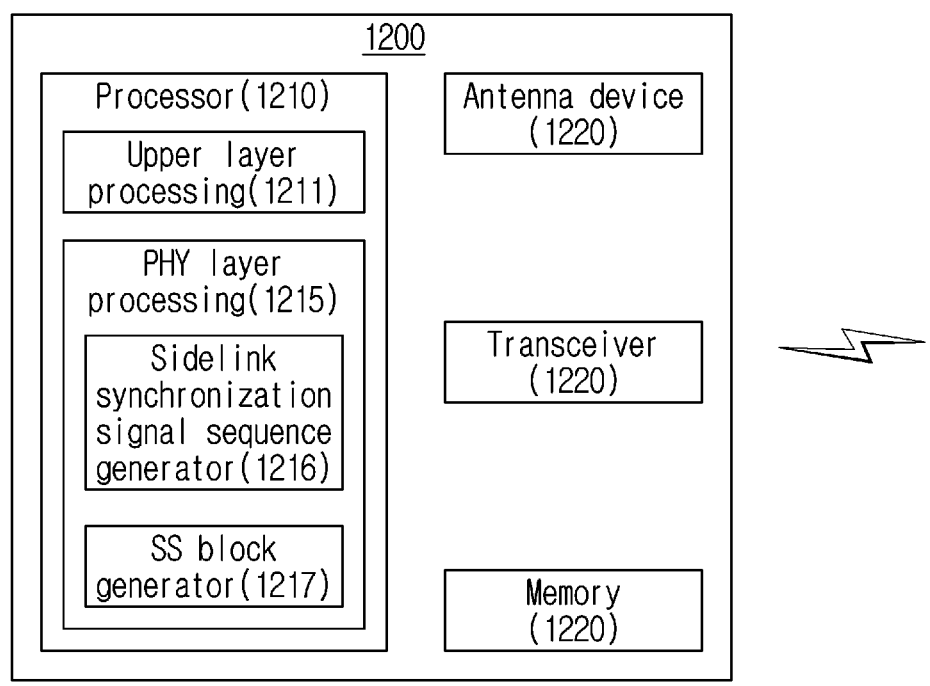
FIG. 12 is a diagram illustrating a configuration of a first terminal device according to the present disclosure.

FIG. 12 is a diagram illustrating a configuration of a first terminal device according to the present disclosure.

Referring to FIG. 12, a first terminal device 1200 may include a processor 1210, an antenna device 1220, a transceiver 1230, and a memory 1240.

The processor 1210 may perform baseband-related signal processing and may include an upper layer processing 1211 and a physical (PHY) layer processing 1215. The upper layer processing 1211 may process an operation of a medium access control (MAC) layer, a radio resource control (RRC) layer, or more upper layers. The PHY layer processing 1215 may process an operation (e.g., downlink (DL) received signal processing, uplink (UL) transmission signal processing, sidelink (SL) transmission signal processing, etc.) of a PHY layer. The processor 1210 may control the overall operation of the first terminal device 1200 in addition to performing the baseband-related signal processing.

The antenna device 1220 may include at least one physical antenna. If the antennal device 1220 includes a plurality of antennas, a multiple input multiple output (MIMO) transmission and reception may be supported. The transceiver 1230 may include a radio frequency (RF) transmitter and an RF receiver. The memory 1240 may store operation processed information of the processor 1210 and software, an operating system (OS), an application, etc., associated with an operation of the first terminal device 1200, and may include a component, such as a buffer.

The processor 1210 of the first terminal device 1200 may be configured to implement an operation of a first UE or an SL transmitting UE in the examples described herein.

For example, the upper layer processing 1211 of the processor 1210 of the first terminal device 1200 may receive a setting and a parameter about a sidelink synchronization signal from a base station and may forward the same to the PHY layer processing 1215.

The PHY layer processing 1215 may include a sidelink synchronization signal sequence generator 1216 and an SS block generator 1217.

The sidelink synchronization signal sequence generator 1216 may determine values of $N_{ID}^{(1)}$ and $N_{ID}^{(2)}$ based on a sidelink identity (SLID) or $N_{ID}^{SL}$.

Here, various examples of the present disclosure may include a case in which a physical layer sidelink synchronization identity set is configured using two types (e.g., id_net and id_oon in the example of FIG. 9) or a case in which the physical layer sidelink synchronization identity set is configured using three types (e.g., id_net_1, id_net_2, and id_oon in the example of FIG. 9).

Also, various examples of the present disclosure may include a case in which each type of the physical layer sidelink synchronization identity set (e.g., each of id_net and id_oon, or each of id_net_1, id_net_2, and id_oon in the example of FIG. 9) includes 168 sequences, a case in which each type thereof includes 336 sequences, a case in which each type thereof 504 sequences, or a case in which each type thereof includes 1008 sequences.

As described above, values of $N_{ID}^{(1)}$ and $N_{ID}^{(2)}$ corresponding to an SLID value may be determined based on a number of types of a physical layer sidelink synchronization identity set and a number of synchronization signal sequences included in each type of the identity set.

The sidelink synchronization signal sequence generator 1216 may generate an NR-primary sidelink synchronization signal (NR-PSSS) sequence by applying a first initialization value to a first primitive polynomial. Also, the transmitting UE may determine a cyclic shift (CS) value to be applied to the generated NR-PSSS sequence based on the value of $N_{ID}^{(2)}$ and may apply CS to an NR-PSSS.

Here, in various examples of the present disclosure, an NR sidelink synchronization signal sequence may be distinguished from an NR downlink synchronization signal sequence by applying a first primitive polynomial used to generate an NR-PSSS sequence to be distinguished from a first primitive polynomial applied to the NR downlink synchronization signal sequence.

Also, in various examples of the present disclosure, an NR sidelink synchronization signal sequence may be distinguished from an NR downlink synchronization signal sequence by applying a CS value for an NR-PSSS distinguished from a CS value applied to the NR downlink synchronization signal sequence.

The sidelink synchronization signal sequence generator 1216 may generate a first NR-secondary sidelink synchronization signal (NR-SSSS) sequence by applying a second initialization value to the first primitive polynomial and may generate a second NR-SSSS sequence by applying the second initialization value to a second primitive polynomial.

Here, in various examples of the present disclosure, an NR sidelink synchronization signal sequence may be distinguished from an NR downlink synchronization signal sequence by applying at least one of first and second primitive polynomials used to generate an NR-SSSS sequence to be distinguished from at least one of first and second primitive polynomials applied to the NR downlink synchronization signal sequence.

The sidelink synchronization signal sequence generator 1216 may determine a CS value to be applied to the first NR-SSSS sequence based on the values of $N_{ID}^{(1)}$ and $N_{ID}^{(2)}$ and may apply CS to the first NR-SSSS. Also, the transmitting UE may determine a CS value to be applied to the generated second NR-SSSS sequence based on the values of $N_{ID}^{(1)}$ and $N_{ID}^{(2)}$ and may apply CS to the second NR-SSSS sequence.

Here, in various examples of the present disclosure, an NR sidelink synchronization signal sequence may be distinguished from an NR downlink synchronization signal sequence by applying at least one of a CS value for a first NR-SSSS sequence and a CS value for a second NR-SSSS sequence to be distinguished from a CS value applied to the NR downlink synchronization signal sequence.

The sidelink synchronization signal sequence generator 1216 may generate an NR-PSSS modulation symbol by performing BPSK modulation of the NR-PSSS sequence to which the CS is applied. Also, the transmitting UE7 may generate an NR-PSSS modulation symbol by multiplying a BPSK modulation result of the first NR-SSSS sequence to which the CS is applied by a BPSK modulation result of the second NR-SSSS sequence to which the CS is applied.

The SS block generator 1217 may map the NR-PSSS modulation symbol on consecutive subcarriers on a frequency in a single symbol within a single SS block and may map the NR-SSSS modulation symbol on consecutive subcarriers on the frequency in another symbol within the single SS block. The PHY layer processing 1215 may generate and transmit a sidelink synchronization signal based on a modulation symbol mapped on time-frequency resources.

Figure 13:
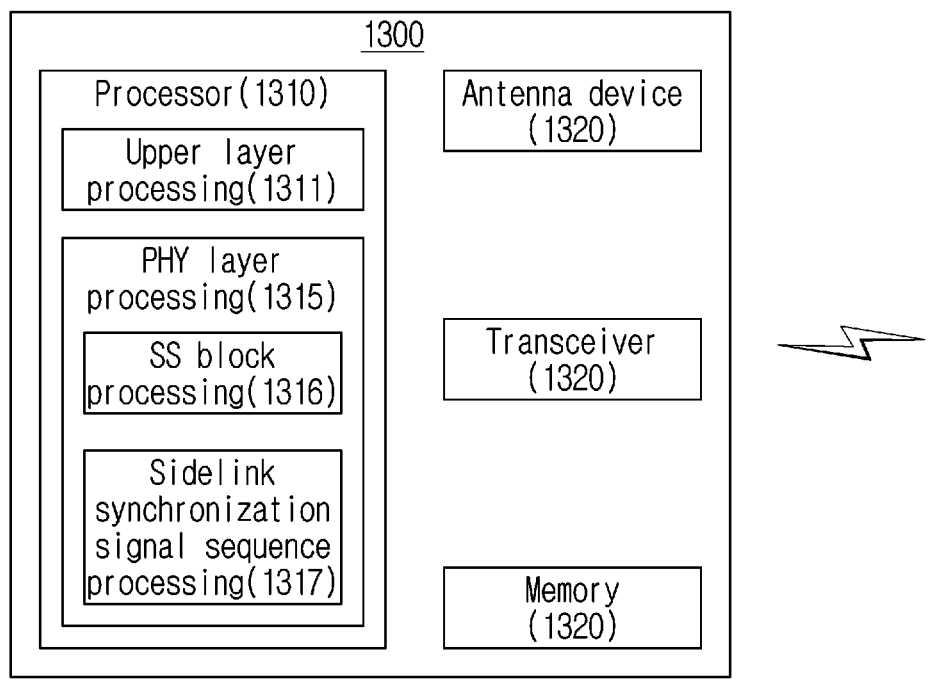
FIG. 13 is a diagram illustrating a configuration of a second terminal device according to the present disclosure.

FIG. 13 is a diagram illustrating a configuration of a second terminal device according to the present disclosure.

Referring to FIG. 13, a second terminal device 1300 may include a processor 1310, an antenna device 1320, a transceiver 1330, and a memory 1340.

The processor 1310 may perform baseband-related signal processing and may include an upper layer processing 1311 and a PHY layer processing 1315. The upper layer processing 1311 may process an operation of a MAC layer, an RRC layer, or more upper layers. The PHY layer processing 1315 may process an operation (e.g., DL received signal processing, UL transmission signal processing, SL received signal processing, etc.) of a PHY layer. The processor 1310 may control the overall operation of the second terminal device 1300 in addition to performing baseband-related signal processing.

The antenna device 1320 may include at least one physical antenna. If the antenna device 1320 includes a plurality of antennas, MIMO transmission and reception may be supported. The transceiver 1330 may include an RF transmitter and an RF receiver. The memory 1340 may store operation processed information of the processor 1310, software, an OS, an application, etc., associated with an operation of the second terminal device 1300, and may include a component, such as a buffer.

The processor 1310 of the second terminal device 1300 may be configured to implement an operation of a second UE or an SL receiving UE in the examples described herein.

The upper layer processing 1311 of the processor 1310 of the second terminal device 1300 may receive a setting and a parameter about a sidelink synchronization signal from a base station and may forward the same to the PHY layer processing 1315.

The PHY layer processing 1315 may include an SS block processing 1316 and a sidelink synchronization signal sequence processing 1317.

The SS block processing 1316 may receive an SS block from the first terminal device 1200. The SS block processing 1316 may detect, from a single symbol within a single SS block, an NR-PSSS modulation symbol mapped on consecutive subcarriers on a frequency and may detect, from another symbol within the single SS block, an NR-SSSS modulation symbol mapped on consecutive subcarriers on the frequency.

The sidelink synchronization signal sequence processing 1317 may determine an NR-PSSS sequence to which CS is applied from the detected NR-PSSS modulation symbol. Also, the sidelink synchronization signal sequence processing 1317 may determine a first NR-SSSS sequence to which the CS is applied and a second NR-SSSS sequence to which the CS is applied from the detected NR-SSSS modulation symbol.

The sidelink synchronization signal sequence processing 1317 may calculate a value of $N_{ID}^{(2)}$ from a first primitive polynomial and a CS value applied to the determined NR-PSSS sequence.

Here, in various examples of the present disclosure, an NR sidelink synchronization signal sequence may be distinguished from an NR downlink synchronization signal sequence by applying a first primitive polynomial used to generate an NR-PSSS sequence to be distinguished from a first primitive polynomial applied to an NR downlink synchronization signal sequence.

Also, in various examples of the present disclosure, an NR sidelink synchronization signal sequence may be distinguished from an NR downlink synchronization signal sequence by applying a CS value for an NR-PSSS to be distinguished from a CS value applied to the NR downlink synchronization signal sequence.

The sidelink synchronization signal sequence processing 1317 may be pre-aware of a first primitive polynomial and a candidate CS value applicable to generate the NR-PSSS sequence and thus, may verify a CS value applied to a corresponding NR-PSSS from the determined NR-PSSS sequence and may calculate a value of $N_{ID}^{(2)}$ from the verified CS value.

The sidelink synchronization signal sequence processing 1317 may calculate a value of $N_{ID}^{(1)}$ from the CS value applied to the determined first NR-SSSS sequence and the CS value applied to the second NR-SSSS sequence.

Here, in various examples of the present disclosure, an NR sidelink synchronization signal sequence may be distinguished from an NR downlink synchronization signal sequence by applying at least one of first and second primitive polynomials used to generate an NR-SSSS sequence to be distinguished from at least one of first and second primitive polynomials applied to the NR downlink synchronization signal sequence.

Also, in various examples of the present disclosure, an NR sidelink synchronization signal sequence may be distinguished from an NR downlink synchronization signal sequence by applying at least one of a CS value for a first NR-SSSS sequence and a CS value for a second NR-SSSS sequence to be distinguished from a CS value applied to the NR downlink synchronization signal sequence.

The sidelink synchronization signal sequence processing 1317 may be pre-aware of first and second primitive polynomials and a candidate CS value applicable to generate the first and second NR-SSSS sequences and thus, may verify a CS value applied to each NR-PSSS from each of the first and second NR-SSSS sequences and may calculate the value of $N_{ID}^{(1)}$ from the verified CS value and the value of $N_{ID}^{(2)}$.

The sidelink synchronization signal sequence processing 1317 may determine an SLID (or $N_{ID}^{SL}$) from the calculated values of $N_{ID}^{(1)}$ and $N_{ID}^{(2)}$.

Here, various examples of the present disclosure may include a case in which a physical layer sidelink synchronization identity set is configured using two types (e.g., id_net and id_oon in the example of FIG. 9) or a case in which the physical layer sidelink synchronization identity set is configured using three types (e.g., id_net_1, id_net_2, and id_oon in the example of FIG. 9).

Also, various examples of the present disclosure may include a case in which each type of the physical layer sidelink synchronization identity set (e.g., each of id_net and id_oon, or each of id_net_1, id_net_2, and id_oon in the example of FIG. 9) includes 168 sequences, a case in which each type thereof includes 336 sequences, a case in which each type thereof includes 504 sequences, or a case in which each type thereof includes 1008 sequences.

The sidelink synchronization signal sequence processing 1317 may be pre-aware of a number of types of a physical layer sidelink synchronization identity set and a number of synchronization signal sequences included in each type of the identity set and thus, may determine an SLID value corresponding to the values of $N_{ID}^{(1)}$ and $N_{ID}^{(2)}$.

The aforementioned description made in the foregoing examples of the present disclosure may apply alike to an operation of the first terminal device 1200 and the second terminal device 1300 and thus, a further description is omitted.

In the example methods described above, processes are described as a series of operations based on a flowchart, aspects of the present disclosure are not limited to the illustrated order or sequence. Some operation may be processed in a different order or may be processed substantially simultaneously. Further, it will be understood that the illustrated operations in a flowchart do not necessarily exclude other operations, other operations may be included and one or more operations may be omitted without departing from the spirit and scope of the present disclosure.

Various embodiments of the present disclosure are not all the possible combinations and are to explain the representative aspects of the present disclosure. Thus, it will be apparent that the descriptions made in various embodiments may apply independently or combination of at least two thereof.

Also, various embodiments of the present disclosure may be implemented by hardware, firmware, software, or combinations thereof. In the case of implementation by hardware, the embodiments may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various embodiments may be executed on an apparatus or a computer, and a non-transitory computer-readable medium storing such software or instructions to be executable on an apparatus or a computer.

What is claimed is:

1. A method comprising:
    determining, by a wireless user device, a first sidelink identity (SLID) parameter and a second SLID parameter;
    determining, by the wireless user device, a first parameter associated with a sidelink primary synchronization signal, based on:
        a second parameter;
        an offset value; and
        a multiple of the second SLID parameter;
    determining, by the wireless user device and based on the first parameter, a sequence for the sidelink primary synchronization signal; and
    transmitting, from the wireless user device to a second wireless user device, at least one sidelink synchronization signal comprising the sidelink primary synchronization signal and comprising a sidelink secondary synchronization signal.

2. The method of claim 1, wherein the first parameter is determined based on a sum of the second parameter, the offset value, and the multiple of the second SLID parameter.

3. The method of claim 1, wherein the second parameter is integer n, where 0≤n<N, and N is a preconfigured integer corresponding to a length of the sequence for the sidelink primary synchronization signal, and
wherein the first parameter is determined based on a modulo operation by using:
a sum of the second parameter, the offset value, and the multiple of the second SLID parameter; and
N.

4. The method of claim 1, wherein the second SLID parameter comprises either a first value indicating that the wireless user device is synchronized with a base station or a second value indicating that the wireless user device is not synchronized with a base station.

5. The method of claim 1,
wherein the sequence comprises $d_{PSS}(n)$, wherein $d_{PSS}(n)=1-2x(m)$, $m=(n+p \cdot N_{ID}^{(2)}+k) \bmod N$, k is the offset value, p is an integer value, and $N_{ID}^{(2)}$ is the second SLID parameter, and $p \cdot N_{ID}^{(2)}$ is the multiple of the second SLID parameter, where 0≤n<N, and N is a preconfigured integer.

6. The method of claim 5, wherein p is equal to 43, wherein k is equal to 21 or 22, and wherein N is 127.

7. The method of claim 1, wherein the multiple of the second SLID parameter is $p \cdot N_{ID}^{(2)}$, and $N_{ID}^{(2)}$ is the second SLID parameter, and
wherein k is the offset value, and $$k = \left\lfloor \frac{p}{2} \right\rfloor \text{ or } \left\lceil \frac{p}{2} \right\rceil, \text{ where } \left\lfloor \frac{p}{2} \right\rfloor$$

is the floor of $$\frac{p}{2}, \text{ and } \left\lceil \frac{p}{2} \right\rceil$$

is the ceiling of $$\frac{p}{2}.$$

8. The method of claim 1, wherein the multiple of the second SLID parameter is $p \cdot N_{ID}^{(2)}$, and $N_{ID}^{(2)}$ is the second SLID parameter, and
wherein k is the offset value and is one of integer values closest to one half of p.

9. The method of claim 1, wherein the first SLID parameter is selected from a first set {0, 1, 2, ..., 333, 334, 335}, and wherein the second SLID parameter is selected from a second set {0, 1}.

10. The method of claim 1, further comprising:
generating, based on the sequence for the sidelink primary synchronization signal, the sidelink primary synchronization signal; and
generating, based on the first SLID parameter and the second SLID parameter, the sidelink secondary synchronization signal.

11. A method comprising:
receiving, by a wireless user device, a sidelink primary synchronization signal and a sidelink secondary synchronization signal, wherein the sidelink secondary synchronization signal is associated with a sidelink identity (SLID) comprising a first SLID parameter and a second SLID parameter;
determining, by the wireless user device and based on the sidelink primary synchronization signal, the second SLID parameter, wherein a sequence for the sidelink primary synchronization signal is associated with a first parameter that is based on:
a second parameter;
an offset value; and
a multiple of the second SLID parameter; and
determining, by the wireless user device, based on the second SLID parameter, and based on the sidelink secondary synchronization signal, the first SLID parameter.

12. The method of claim 11, further comprising:
determining, based on the first parameter, a sequence for a second sidelink primary synchronization signal; and
transmitting, from the wireless user device to a second wireless user device, the second sidelink primary synchronization signal.

13. The method of claim 12, further comprising:
generating, based on the first SLID parameter and the second SLID parameter, a second sidelink secondary synchronization signal; and
transmitting, from the wireless user device to the second wireless user device, the second sidelink secondary synchronization signal.

14. The method of claim 11, wherein the first parameter is determined based on a sum of the second parameter, the offset value, and the multiple of the second SLID parameter.

15. The method of claim 11, wherein the second parameter is integer n, where 0≤n<N, and N is a preconfigured integer corresponding to a length of the sequence for the sidelink primary synchronization signal,
wherein the first parameter is determined based on a modulo operation by using:
a sum of the second parameter, the offset value, and the multiple of the second SLID parameter; and
N.

16. The method of claim 11, wherein the second SLID parameter comprises either a first value indicating that the wireless user device is synchronized with a base station or a second value indicating that the wireless user device is not synchronized with a base station.

17. The method of claim 11, wherein the determining the second SLID parameter comprises:
determining the sequence, wherein the sequence comprises $d_{PSS}(n)$, wherein $d_{PSS}(n)=1-2x(m)$, $m=(n+p \cdot N_{ID}^{(2)}+k) \bmod N$, k is the offset value, p is an integer value, and $N_{ID}^{(2)}$ is the second SLID parameter, and $p \cdot N_{ID}^{(2)}$ is the multiple of the second SLID parameter, where 0≤n<N, and N is a preconfigured integer.

18. The method of claim 17, wherein p is equal to 43, wherein k is equal to 21 or 22, and wherein N is 127.

19. The method of claim 11, wherein the multiple of the second SLID parameter is $p \cdot N_{ID}^{(2)}$, where $N_{ID}^{(2)}$ is the second SLID parameter, and
wherein k is the offset value, and $$k = \left\lfloor \frac{p}{2} \right\rfloor \text{ or } \left\lceil \frac{p}{2} \right\rceil, \text{ where } \left\lfloor \frac{p}{2} \right\rfloor$$

is the floor of $$\frac{p}{2}, \text{ and } \lceil \frac{p}{2} \rceil$$

is the ceiling of $$\frac{p}{2}.$$

20. The method of claim 11, wherein the multiple of the second SLID parameter is $p \cdot N_{ID}^{(2)}$, where $N_{ID}^{(2)}$ is the second SLID parameter, and
   wherein k is the offset value and is one of integer values closest to one half of p.

21. The method of claim 11, wherein the first SLID parameter is selected from a first set {0, 1, 2, . . . , 333, 334, 335}, and wherein the second SLID parameter is selected from a second set {0, 1}.

22. The method of claim 1, further comprising:
   receiving, by the wireless user device from a base station, at least one downlink synchronization signal block comprising a primary synchronization signal (PSS) and comprising a secondary synchronization signal (SSS),
   wherein the first SLID parameter and the second SLID parameter are associated with an SLID of the wireless user device for sidelink communication between wireless user devices.

23. The method of claim 1, further comprising:
   determining, by the wireless user device, a sequence associated with the sidelink secondary synchronization signal, based on:
      a first value associated with the first SLID parameter and associated with the second SLID parameter; and
      a second value associated with the first SLID parameter,
   wherein the first SLID parameter and the second SLID parameter are associated with an SLID of the wireless user device for sidelink communication between wireless user devices.

* * * * *